US008728673B2

(12) United States Patent
Ogawa et al.

(10) Patent No.: US 8,728,673 B2
(45) Date of Patent: *May 20, 2014

(54) FUEL CELL SYSTEM

(75) Inventors: Tetsuya Ogawa, Wako (JP); Kimiko Fujisawa, Wako (JP); Ayatoshi Yokokawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 430 days.

This patent is subject to a terminal disclaimer.

(21) Appl. No.: 13/057,917

(22) PCT Filed: Jul. 16, 2009

(86) PCT No.: PCT/JP2009/063232
§ 371 (c)(1),
(2), (4) Date: Feb. 7, 2011

(87) PCT Pub. No.: WO2010/016396
PCT Pub. Date: Feb. 11, 2010

(65) Prior Publication Data
US 2011/0143238 A1  Jun. 16, 2011

(30) Foreign Application Priority Data

Aug. 7, 2008 (JP) .................................. 2008-204203
Aug. 7, 2008 (JP) .................................. 2008-204204
May 15, 2009 (JP) .................................. 2009-118173

(51) Int. Cl.
*H01M 8/24* (2006.01)
(52) U.S. Cl.
USPC ........... 429/423; 429/471; 429/441; 429/428; 429/470; 429/456; 429/457; 429/452; 429/430; 429/431; 429/432; 429/413; 429/467

(58) Field of Classification Search
None
See application file for complete search history.

(56) References Cited

U.S. PATENT DOCUMENTS 2,521,063 A * 9/1950 Kleist ............................. 62/443
5,053,291 A * 10/1991 Hirota ........................... 429/458
6,080,500 A * 6/2000 Fuju et al. ..................... 429/515

(Continued)

FOREIGN PATENT DOCUMENTS

| JP | 61-126775 | 6/1986 |
| JP | 4-75263 | 3/1992 |

(Continued)

OTHER PUBLICATIONS

Bujalski, Waldemar et al., "Cycling of three solid oxide fuel cell types," Journal of Power Sources, vol. 171:96-100 (2007).

(Continued)

*Primary Examiner* — Milton I Cano
*Assistant Examiner* — Wojciech Haske
(74) *Attorney, Agent, or Firm* — Nelson Mullins Riley & Scarborough LLP; Anthony A. Laurentano

(57) ABSTRACT

A casing of a fuel cell system is divided into a fluid supply section, a module section, and an electrical equipment section. A detector, a fuel gas supply apparatus, an oxygen-containing gas supply apparatus, and a water supply apparatus are provided in the fluid supply section. A fuel cell module and a combustor are provided in the module section. A power converter and a control device are provided in the electrical equipment section. The module section is interposed between the fluid supply section and the electrical equipment section.

16 Claims, 24 Drawing Sheets

(56) References Cited

U.S. PATENT DOCUMENTS

| | | |
|---|---|---|
| 7,011,901 B2 | 3/2006 | Ueda et al. |
| 7,494,731 B2 | 2/2009 | Hattori et al. |
| 8,178,256 B2 * | 5/2012 | Ogawa et al. ............ 429/471 |
| 2002/0006535 A1 * | 1/2002 | Woods et al. ............ 429/17 |
| 2004/0048120 A1 * | 3/2004 | Haltiner et al. ............ 429/24 |

FOREIGN PATENT DOCUMENTS

| | | | |
|---|---|---|---|
| JP | 08031436 A * | 2/1996 | ............ H01M 8/04 |
| JP | 2002-170591 | 6/2002 | |
| JP | 2003-217635 | 7/2003 | |
| JP | 2003-297409 | 10/2003 | |
| JP | 2006-86017 | 3/2006 | |
| JP | 2006-107941 | 4/2006 | |
| JP | 2006-140164 | 6/2006 | |
| JP | 2006-302574 | 11/2006 | |
| WO | WO 2008114570 A1 * | 9/2008 | ............ H01M 8/04 |

OTHER PUBLICATIONS

Mazumder, Sudip K. et al., "A Ripple-Mitigating and Energy-Efficient Fuel Cell Power-Conditioning System," IEEE Transactions on Power Electronics, vol. 22(4):1437-1452 (2007).

Japanese Office Action for Application No. 2009-118173, 6 pages, dated Apr. 16, 2013.

Japanese Office Action for Application No. 2009-118174, 5 pages, dated Apr. 16, 2013.

Lawrence, Jeremy et al., "Auxiliary power unit based on a solid oxide fuel cell and fuelled with diesel," Journal of Power Sources, vol. 154:479-488 (2006).

International Search Report for Application No. PCT/JP2009/063232, dated Sep. 28, 2009.

* cited by examiner

---> EXHAUST GAS
——> AIR
---> RAW FUEL (REFORMED GAS)

---> EXHAUST GAS
----> AIR
-----> RAW FUEL (REFORMED GAS)

PRIOR ART

FUEL CELL SYSTEM

RELATED APPLICATIONS

This application is a 35 U.S.C. 371 national stage filing of International Application No. PCT/JP2009/063232 filed Jul. 16, 2009, which claims priority to Japanese Patent Application No. 2008-204203 filed on Aug. 7, 2008, Japanese Patent Application No. 2008-204204 filed Aug. 7, 2008, and Japanese Patent Application 2009-118173 filed May 15, 2009, in Japan. The contents of the aforementioned applications are hereby incorporated by reference.

TECHNICAL FIELD

The present invention relates to a fuel cell system including a fuel cell module, a combustor, a fuel gas supply apparatus, an oxygen-containing gas supply apparatus, a water supply apparatus, a power converter, a control device, and a casing containing the fuel cell module, the combustor, the fuel gas supply apparatus, the oxygen-containing gas supply apparatus, the water supply apparatus, the power converter, and the control device.

BACKGROUND ART

Typically, a solid oxide fuel cell (SOFC) employs a solid electrolyte of ion-conductive solid oxide such as stabilized zirconia. The electrolyte is interposed between an anode and a cathode to form an electrolyte electrode assembly (MEA). The electrolyte electrode assembly is interposed between separators (bipolar plates). In use, normally, predetermined numbers of the electrolyte electrode assemblies and the separators are stacked together to form a fuel cell stack.

As the fuel gas supplied to the fuel cell, normally, a hydrogen gas generated from hydrocarbon raw material by a reformer is used. In general, in the reformer, a reformed raw material gas is obtained from hydrocarbon raw material of a fossil fuel or the like, such as methane or LNG, and the reformed raw material gas undergoes steam reforming, partial oxidation reforming, or autothermal reforming to produce a reformed gas (fuel gas).

In this regard, a fuel cell system (fuel cell power supply apparatus) having a single unit case containing a fuel cell, a reformer, a power converter for converting direct power electrical energy generated in the fuel cell according to a power supply output specification, a control device, and auxiliary devices is known.

For example, in a fuel cell power supply apparatus disclosed in Japanese Laid-Open Patent Publication No. 2003-297409, as shown in FIG. 23, lateral bars $1001a$, $1001b$ are provided in a frame 1001 of the unit case to divide the space in the frame 1001 into three stages. A reformer 1002 is provided on the lateral bar $1001a$ in the upper stage, and a control device 1003 and a fuel cell 1004 are provided on the lateral bar $1001b$ in the middle stage such that back sides of the control device 1003 and the fuel cell 1004 face each other. Heat insulating material $1003a$ is provided on the back surface of the control device 1003, and heat insulating material $1003b$ is provided around the control device 1003 to protect the control device 1003 from the ambient hot environment.

Auxiliary devices such as a fuel pump 1005 for supplying a raw fuel to a reformer 1002 and an air pump $1006a$ for supplying an air as a reactant gas to the fuel cell 1004 are provided on the bottom plate of the frame 1001. An air pump $1006b$ for a reformer burner is provided on an auxiliary rack $1001c$ at an upper position of the frame 1001, and a PG burner 1007 is provided in front of the air pump $1006b$ for the reformer burner. A power converter 1008 is provided on a side of the fuel cell 1004 on the floor of the frame 1001.

Further, for example, in a fuel cell apparatus disclosed in Japanese Laid-Open Patent Publication No. 2006-140164, as shown in FIG. 24, a package 1011 is provided, and a purifier 1012, an ion exchanger 1013, and a desulfurizer 1014 are provided adjacent to a front panel 1015 serving as an outer panel of the package 1011. The purifier 1012, the ion exchanger 1013, and desulfurizer 1014 are components that require maintenance.

Thus, the components that require maintenance are not provided inside the package 1011, but provided adjacent to the front panel 1015 serving as the outer profile of the apparatus body. According to the disclosure, in the structure, maintenance of the components that requires replacement, regeneration or the like for continuing operation of the fuel cell apparatus can be carried out easily.

In Japanese Laid-Open Patent Publication No. 2003-297409, the control device 1003 and the fuel cell 1004 are provided on the lateral bar $1001b$ in the middle stage of the frame 1001 such that the back sides of the control device 1003 and the fuel cell 1004 face each other. The control device 1003 should be used at relatively low temperature. However, the temperature of the fuel cell 1004 is raised by power generation. In particular, in the case where a high temperature fuel cell (such as a solid oxide fuel cell or a molten carbonate fuel cell) or a medium temperature fuel cell (such as a phosphoric acid fuel cell and a hydrogen membrane fuel cell) is used, the control device 1003 may be affected by heat depending on the heat insulating materials $1003a$, $1003b$.

Further, in the system of Japanese Laid-Open Patent Publication No. 2006-140164, the operating temperature range and functions of the respective devices are not considered in the layout. Therefore, in particular, in the case where a high temperature fuel cell (such as a solid oxide fuel cell or a molten carbonate fuel cell) or a medium temperature fuel cell (such as a phosphoric acid fuel cell and a hydrogen membrane fuel cell) is used, the low temperature section which should be maintained at low temperature tends to be affected by diffusion of heat and fluid. Further, the desired maintenance performance cannot be achieved.

SUMMARY OF INVENTION

The present invention has been made to solve the problem of this type, and an object of the present invention is to provide a fuel cell system in which respective devices are disposed depending on the operating temperature range and the function in order to minimize diffusion of heat and fluid and prevent, as much as possible, heat influence on the devices that are used at relatively low temperature, and which is capable of being placed along the wall suitably, and ensuring ease of maintenance.

The present invention relates to a fuel cell system including a fuel cell module for generating electrical energy by electrochemical reactions of a fuel gas and an oxygen-containing gas, a combustor for raising temperature of the fuel cell module, a fuel gas supply apparatus for supplying the fuel gas to the fuel cell module, an oxygen-containing gas supply apparatus for supplying the oxygen-containing gas to the fuel cell module, a water supply apparatus for supplying water to the fuel cell module, a power converter for converting direct current electrical energy generated in the fuel cell module to electrical energy according to requirements specification, a control device for controlling the amount of electrical energy generated in the fuel cell module, and a casing containing the fuel cell module, the combustor, the fuel gas supply apparatus, the oxygen-containing gas supply apparatus, the water supply apparatus, the power converter, and the control device.

The casing is divided into a module section where the fuel cell module and the combustor are disposed, a fluid supply section where the fuel gas supply apparatus, the oxygen-containing gas supply apparatus, and the water supply apparatus are disposed, and an electrical equipment section where the power converter and the control device are disposed. The module section is interposed between the fluid supply section and the electrical equipment section.

According to the present invention, the space in the casing is divided into the module section containing therein the fuel cell module and the combustor, the fluid supply section containing therein the fuel gas supply apparatus, the oxygen-containing gas supply apparatus, and the water supply apparatus, and the electrical equipment section containing therein the power converter and the control device. In the structure, the space in the casing is divided depending on the operating temperature and function to minimize diffusion of heat and fluid. In terms of functionality, the optimum layout is achieved advantageously.

Further, the fluid supply section is disposed on one side surface of the module section. In the structure, the fluid supply section forms an outer wall of the casing. Cooling of the fluid supply section is facilitated, and the fluid supply section does not become hot easily. Likewise, the electrical equipment section is disposed on the other side surface of the module section. Therefore, the electrical equipment section forms an outer wall of the casing. Cooling of the electrical equipment section is facilitated, and the electrical equipment section does not become hot easily.

Accordingly, heat influence on the devices that should be used at relatively low temperature, such as the fluid supply section containing pumps and the electrical equipment section containing the control device is prevented as much as possible. The functions of the components are maintained, and the components are operated reliably.

Further, the module section is interposed between the fluid supply section and the electrical equipment section. Thus, the casing is elongated laterally in the direction in which the fluid supply section, the module section, and the electrical equipment section are arranged. The dimension in the depth direction intersecting the lateral direction is reduced efficiently. The casing is suitably placed along the wall.

Further, since the fluid supply section, the module section, and the electrical equipment section are arranged in the lateral direction, the respective components can be accessed from the front side for carrying out maintenance operation. Accordingly, the maintenance operation can be carried out easily.

The above and other objects, features, and advantages of the present invention will become more apparent from the following description when taken in conjunction with the accompanying drawings in which preferred embodiments of the present invention are shown by way of illustrative example.

DESCRIPTION OF EMBODIMENTS

Figure 1:
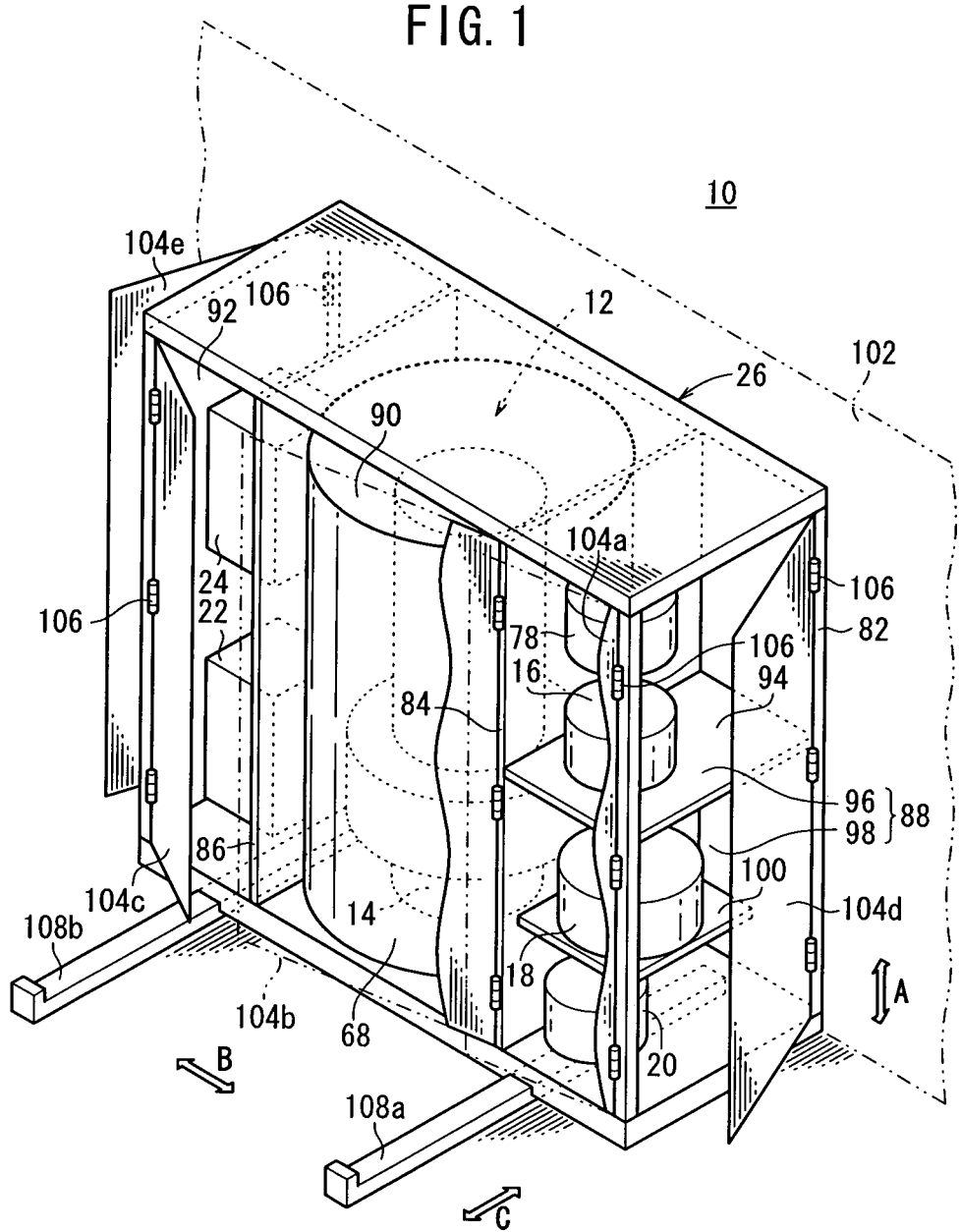
FIG. 1 is a perspective view schematically showing a fuel cell system according to a first embodiment of the present invention.

A fuel cell system 10 according to a first embodiment of the present invention is used in various applications, including stationary and mobile applications. For example, the fuel cell system 10 is mounted on a vehicle. As shown in FIGS. 1 to 4, the fuel cell system 10 includes a fuel cell module 12 for generating electrical energy in power generation by electrochemical reactions of a fuel gas (hydrogen gas) and an oxygen-containing gas (air), a combustor 14 for raising the temperature of the fuel cell module 12, a fuel gas supply apparatus (including a fuel gas pump) 16 for supplying the fuel gas to the fuel cell module 12, an oxygen-containing gas supply apparatus (including an air pump) 18 for supplying an oxygen-containing gas to the fuel cell module 12, a water supply apparatus (including a water pump) 20 for supplying water to the fuel cell module 12, a power converter 22 for converting the direct current electrical energy generated in the fuel cell module 12 to electrical energy according to the requirements specification, and a control device 24 for controlling the amount of electrical energy generated in the fuel cell module 12. The fuel cell module 12, the combustor 14, the fuel gas supply apparatus 16, the oxygen-containing gas supply apparatus 18, the water supply apparatus 20, the power converter 22, and the control device 24 are disposed in a single casing 26.

Figure 5:
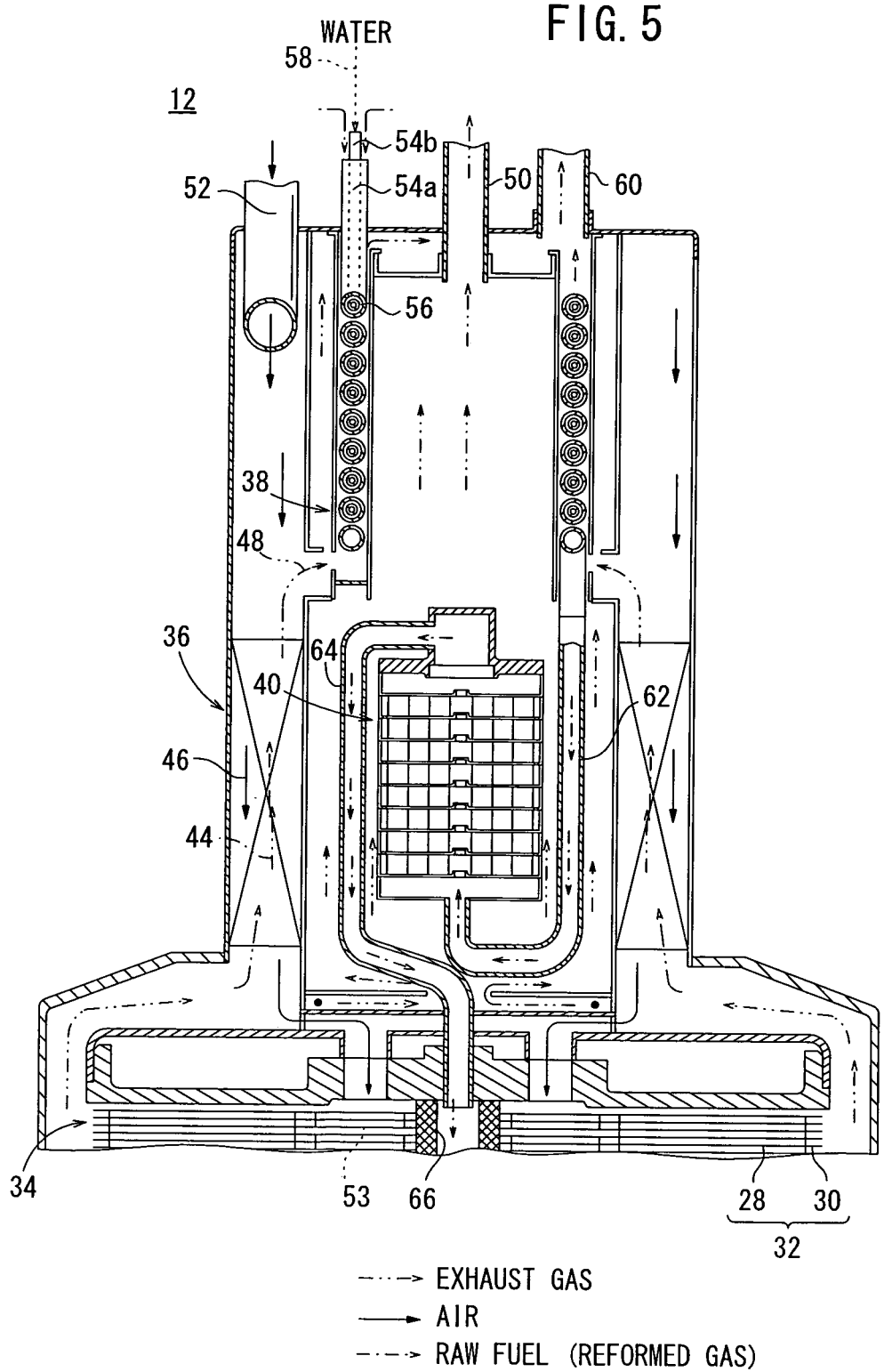
FIG. 5 is a cross sectional view showing main components of a fuel cell module of the fuel cell system.

As shown in FIG. 5, the fuel cell module 12 includes a fuel cell stack 34 formed by stacking a plurality of solid oxide fuel cells 32 in a vertical direction. The fuel cells 32 are formed by stacking electrolyte electrode assemblies 28 and separators 30. Though not shown, each of the electrolyte electrode assemblies 28 includes a cathode, an anode, and a solid electrolyte (solid oxide) interposed between the cathode and the anode. For example, the electrolyte is made of ion-conductive solid oxide such as stabilized zirconia.

Figure 3:
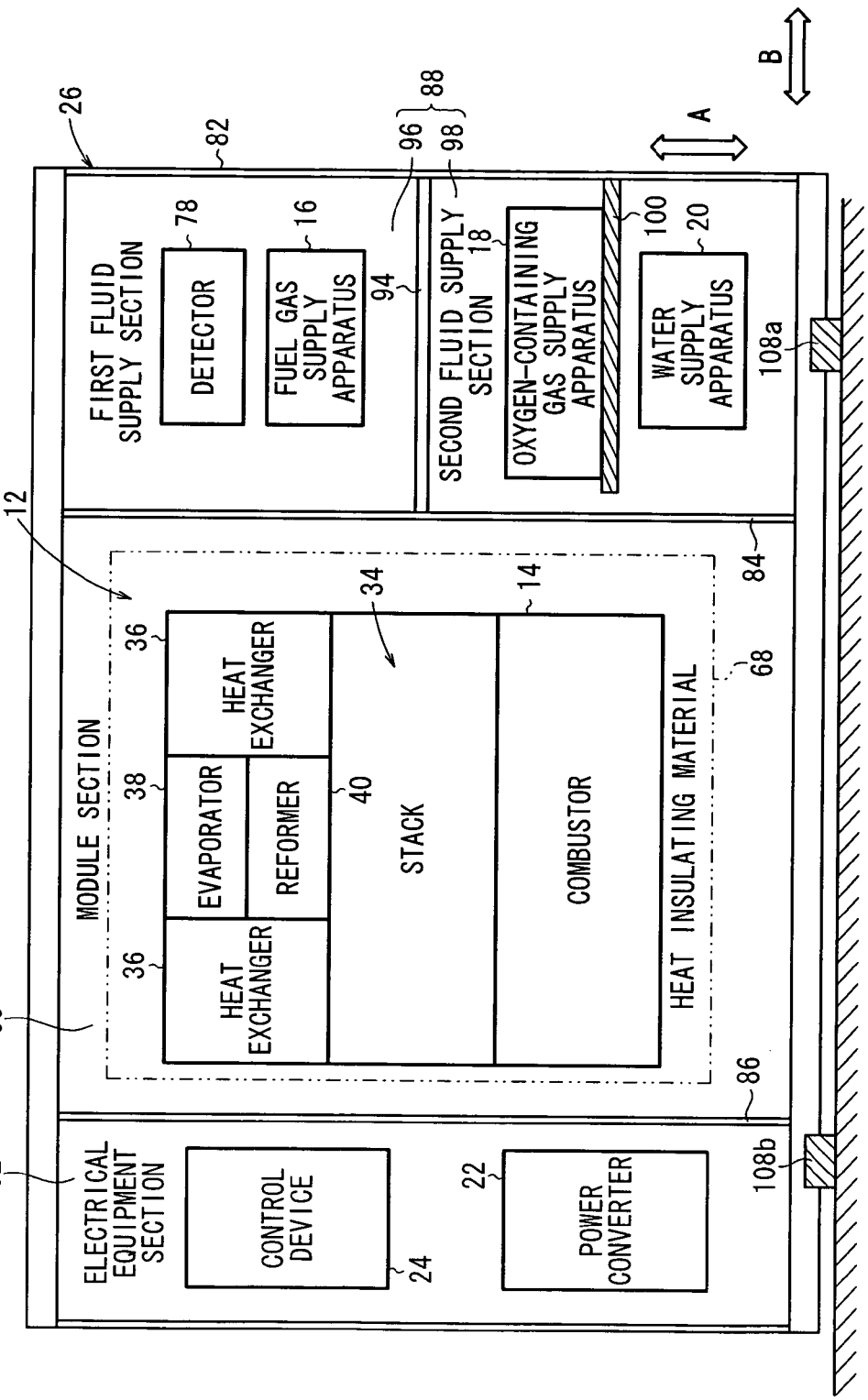
FIG. 3 is a front view showing the fuel cell system.

As shown in FIG. 3, at an upper end of the fuel cell stack 34 in the stacking direction, a heat exchanger 36 for heating the oxygen-containing gas before the oxygen-containing gas is supplied to the fuel cell stack 34, an evaporator 38 for evaporating water to produce a mixed fuel of a raw fuel (e.g., city gas) chiefly containing hydrocarbon and water vapor, and a reformer 40 for reforming the mixed fuel to produce a reformed gas are provided.

Figure 4:
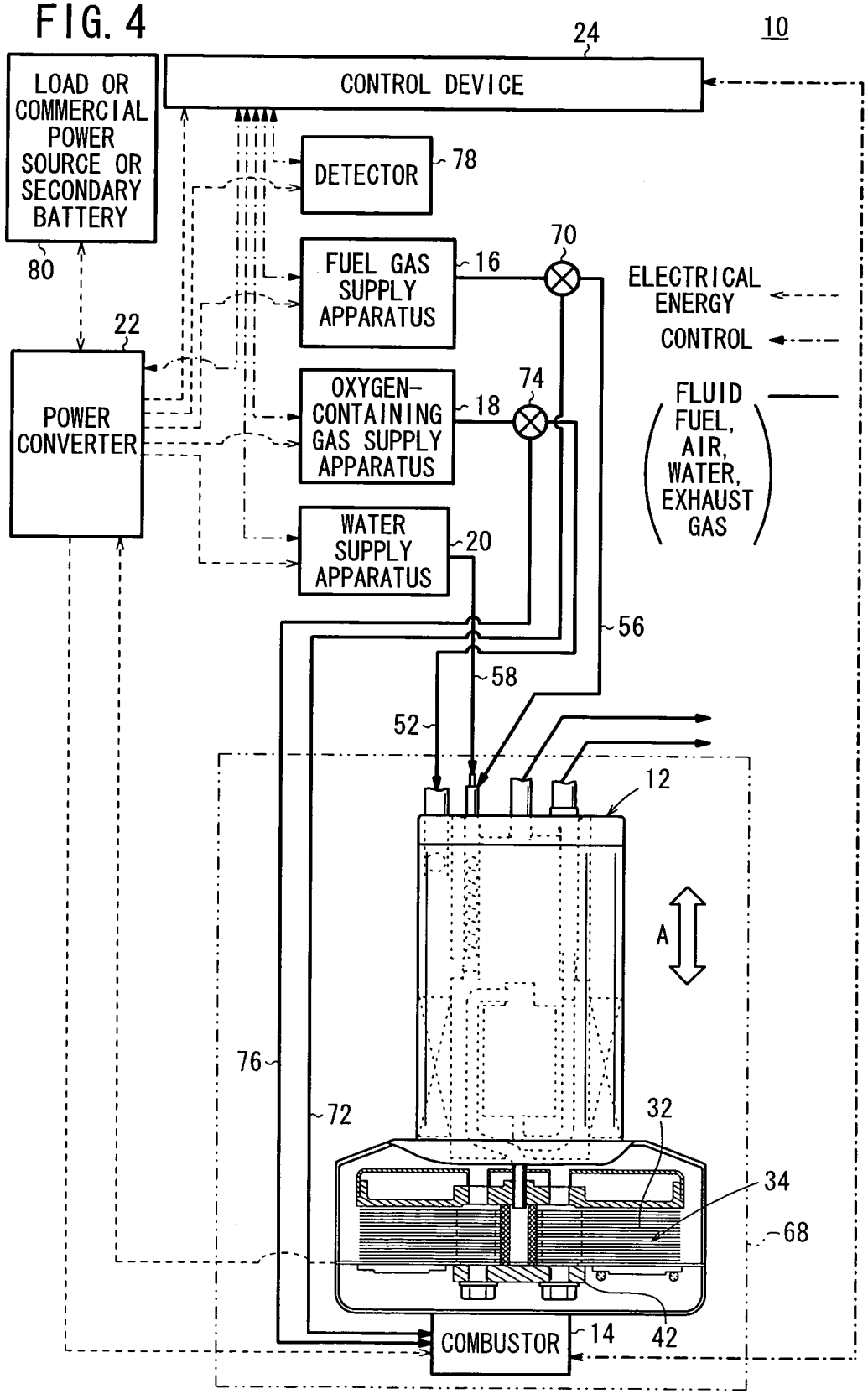
FIG. 4 is a circuit diagram showing the fuel cell system.

At a lower end of the fuel cell stack 34 in the stacking direction, a load applying mechanism 42 for applying a tightening load to the fuel cells 32 of the fuel cell stack 34 in the stacking direction indicated by the arrow A is provided (see FIG. 4).

The reformer 40 is a preliminary reformer for reforming higher hydrocarbon ($C_{2+}$) such as ethane ($C_2H_6$), propane ($C_3H_8$), and butane ($C_4H_{10}$) contained in the city gas, into raw fuel gas chiefly containing methane ($CH_4$), by steam reforming. The operating temperature of the reformer 40 is several hundred ° C.

The operating temperature of the fuel cell 32 is high, at several hundred ° C. In the electrolyte electrode assembly 28, methane in the fuel gas is reformed to obtain hydrogen, and the hydrogen is supplied to the anode.

As shown in FIG. 5, the heat exchanger 36 has a first exhaust gas channel 44 serving as a passage of a consumed reactant gas discharged from the fuel cell stack 34 (hereinafter also referred to as the exhaust gas or the combustion exhaust gas) and an air channel 46 serving as a passage of the air for allowing the air serving as a heated fluid and the exhaust gas to flow in a counterflow manner. The first exhaust gas channel 44 is connected to a second exhaust gas channel 48 for supplying the exhaust gas to the evaporator 38 as a heat source for evaporating water. The first exhaust gas channel 44 is connected to an exhaust gas pipe 50. The upstream side of the air channel 46 is connected to an air supply pipe 52, and the downstream side of the air channel 46 is connected to an oxygen-containing gas supply passage 53 of the fuel cell stack 34.

The evaporator 38 has a dual pipe structure including an outer pipe member 54a and an inner pipe member 54b which are coaxially arranged. The dual pipe is provided in the second exhaust gas channel 48. A raw fuel channel 56 is formed between the outer pipe member 54a and the inner pipe member 54b. Further, a water channel 58 is formed in the inner pipe member 54b. The second exhaust gas channel 48 of the evaporator 38 is connected to a main exhaust pipe 60.

The outer pipe member 54a is connected to a mixed fuel supply pipe 62 coupled to an inlet of the reformer 40. One end of a reformed gas supply channel 64 is coupled to an outlet of the reformer 40, and the other end of the reformed gas supply channel 64 is connected to the fuel gas supply passage 66 of the fuel cell stack 34. The fuel cell module 12 and the combustor 14 are surrounded by heat insulating material 68 (see FIG. 3).

As shown in FIG. 4, the fuel gas supply apparatus 16 is connected to the raw fuel channel 56. A raw fuel branch channel 72 is connected to a position in midstream of the raw fuel channel 56 through a switching valve 70. The raw fuel branch channel 72 is connected to the combustor 14.

The oxygen-containing gas supply apparatus 18 is connected to the air supply pipe 52, and the air branch channel 76 is connected to a switching valve 74 provided at a position in midstream of the air supply pipe 52. The air branch channel 76 is connected to the combustor 14. For example, the combustor 14 has a burner, and as described above, the raw fuel and the air are supplied to the combustor 14. Instead of the burner, other means (e.g., electric heater) may be adopted. In this case, the raw fuel, the air, and electricity should be supplied selectively as necessary.

The water channel 58 is connected to the water supply apparatus 20. The fuel gas supply apparatus 16, the oxygen-containing gas supply apparatus 18, and the water supply apparatus 20 are controlled by the control device 24. A detector 78 for detecting the fuel gas is electrically connected to the control device 24. For example, a commercial power source 80 (or other components such as a load or a secondary battery) is connected to the power converter 22.

Figure 2:
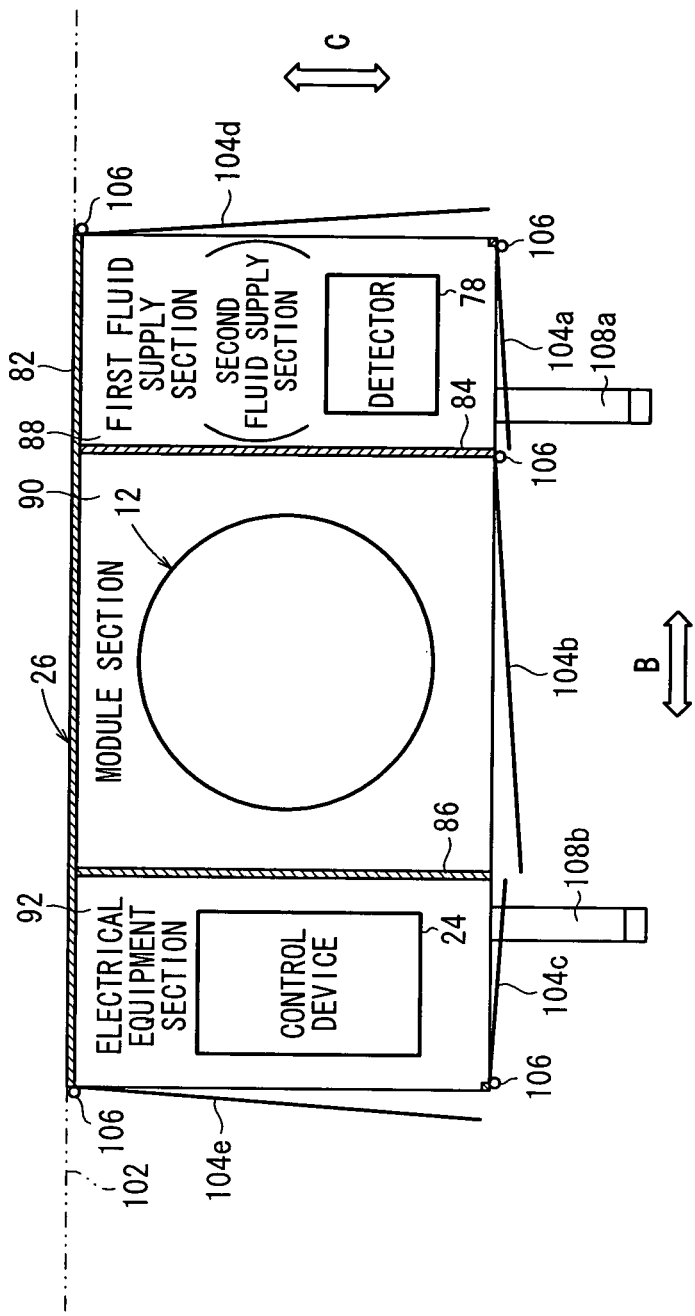
FIG. 2 is a plan view showing the fuel cell system.

As shown in FIGS. 1 to 3, the casing 26 includes an outer frame 82 having a rectangular shape elongated in a direction indicated by an arrow B as a whole. In the outer frame 82, a first vertical partition plate 84 and a second vertical partition plate 86 are provided at predetermined intervals. The space in the casing 26 is divided horizontally (in the direction indicated by the arrow B) into a fluid supply section 88, a module section 90, and an electrical equipment section 92 by the first vertical partition plate 84 and the second vertical partition plate 86. The module section 90 is interposed between the fluid supply section 88 and the electrical equipment section 92.

The fluid supply section 88 is divided into a first supply section (first fluid supply section) 96 at an upper position and a second supply section (second fluid supply section) 98 at a lower position by a lateral partition plate 94. The fuel gas supply apparatus 16 and the detector 78 are placed in the first supply section 96. The detector 78 is provided above the fuel gas supply apparatus 16. The oxygen-containing gas supply apparatus 18 and the water supply apparatus 20 are placed in the second supply section 98. The water supply apparatus 20 is provided in the lowest part of the fluid supply section 88. The oxygen-containing gas supply apparatus 18 is held on a table 100 in the second supply section 98.

As shown in FIGS. 1 and 3, the fuel cell module 12 and the combustor 14 are placed in the module section 90. The fuel cell module 12 is provided above the combustor 14. The fuel cell module 12 and the combustor 14 are placed in the heat insulating material 68. The power converter 22 and the control device 24 are provided in the electrical equipment section 92.

As shown in FIGS. 1 and 2, the casing 26 is elongated in a direction in which the fluid supply section 88, the module section 90, and the electrical equipment section 92 are arranged, i.e., in a lateral direction indicated by the arrow B. The casing has a small dimension in a depth direction intersecting the lateral direction, i.e., in a direction indicated by an arrow C, and the back surface of the casing 26 in the depth direction is provided along a wall 102.

Open/close doors (door members) 104a, 104b, 104c are attached to the front side of the casing 26 through hinges 106 for opening and closing the fluid supply section 88, the module section 90, and the electrical equipment section 92.

On opposite sides of the casing 26 in the lateral direction, open/close doors (door members) 104d, 104e are mounted through hinges 106 for opening and closing the fluid supply section 88 and the electrical equipment section 92, respectively. Instead of the open/close doors 104a to 104e, panels or the like may be used. For example, the casing 26 has guide members such as a pair of slide rails 108a, 108b, and the casing 26 are movable back and forth in the direction indicated by the arrow C through the slide rails 108a, 108b.

Operation of the fuel cell system 10 will be described below.

As shown in FIG. 4, by operation of the fuel gas supply apparatus 16, for example, a raw fuel such as the city gas (including $CH_4$, $C_2H_8$, $C_3H_8$, $C_4H_{10}$) is supplied to the raw fuel channel 56. Further, by operation of the water supply apparatus 20, water is supplied to the water channel 58, and the oxygen-containing gas such as the air is supplied to the air supply pipe 52 through the oxygen-containing gas supply apparatus 18.

As shown in FIG. 5, in the evaporator 38, the raw fuel flowing through the raw fuel channel 56 is mixed with the water vapor, and a mixed fuel is obtained. The mixed fuel is supplied to the inlet of the reformer 40 through the mixed fuel supply pipe 62. The mixed fuel undergoes steam reforming in the reformer 40. Thus, hydrocarbon of $C_{2+}$ is removed (reformed), and a reformed gas (fuel gas) chiefly containing methane is obtained. The reformed gas flows through the reformed gas supply channel 64 connected to the outlet of the reformer 40, and the reformed gas is supplied to the fuel gas supply passage 66 of the fuel cell stack 34. Thus, the methane in the reformed gas is reformed, and hydrogen gas is obtained. The fuel gas chiefly containing the hydrogen gas is supplied to the anodes (not shown).

The air supplied from the air supply pipe 52 to the heat exchanger 36 moves along the air channel 46 in the heat exchanger 36, and is heated to a predetermined temperature by heat exchange with the exhaust gas (to be described later) moving along the first exhaust gas channel 44. The air heated by the heat exchanger 36 is supplied to the oxygen-containing gas supply passage 53 of the fuel cell stack 34, and the air is supplied to the cathodes (not shown).

Thus, in each of the electrolyte electrode assemblies 28, by electrochemical reactions of the fuel gas and the air, power generation is performed. The hot exhaust gas (several hundred ° C.) discharged to the outer circumferential region of each of the electrolyte electrode assemblies 28 flows through the first exhaust gas channel 44 of the heat exchanger 36, and heat exchange with the air is carried out. The air is heated to a predetermined temperature, and the temperature of the exhaust gas is decreased.

When the exhaust gas moves along the second exhaust gas channel 48, the water passing through the water channel 58 is evaporated. After the exhaust gas passes through the evaporator 38, the exhaust gas is discharged to the outside through the main exhaust pipe 60.

In the first embodiment, as shown in FIGS. 1 and 3, in the module section 90 formed by dividing the space in the casing 26 in the horizontal direction, the fuel cell module 12 and the combustor 14 are provided. The fuel cell module 12 is provided above the combustor 14.

In the structure, the heat (several hundred ° C.) generated by operation of the combustor 14 convects upwardly and is reliably supplied to an area around the fuel cell module 12 which is disposed above the combustor 14. Thus, the temperature of the fuel cell module 12 is suitably raised in a short period of time by the heat convecting upwardly from the combustor 14. Accordingly, improvement in the performance of starting operation of the fuel cell system 10 is achieved advantageously.

Further, in the first embodiment, the space in the casing 26 is divided into the fluid supply section 88, the module section 90, and the electrical equipment section 92 by the first vertical partition plate 84 and the second vertical partition plate 86. Then, the detector 78, the fuel gas supply apparatus 16, the oxygen-containing gas supply apparatus 18, and the water supply apparatus 20 are provided in the fluid supply section 88. The fuel cell module 12 and the combustor 14 are provided in the module section 90. The power converter 22 and the control device 24 are provided in the electrical equipment section 92.

Thus, the space in the casing 26 is divided into the module section 90, the fluid supply section 88, and the electrical equipment section 92 depending on the operating temperature and the function. In the structure, diffusion of heat and fluid is minimized. In terms of functionality, the module section 90, the fluid supply section 88, and the electrical equipment section 92 are arranged suitably.

Further, since the fluid supply section 88 forms part of the outer wall of the casing 26, cooling of the fluid supply section 88 is facilitated, and the fluid supply section 88 does not become hot easily. Likewise, since the electrical equipment section 92 forms part of the outer wall of the casing 26, cooling of the electrical equipment section 92 is facilitated, and the electrical equipment section 92 does not become hot easily.

The temperature of the electrical equipment section 92 containing the control device 24 and the fluid supply section 88 containing the pumps need to be maintained at low temperature (around 40° C.). Thermal influence on the electrical equipment section 92 and the fluid supply section 88 is prevented as much as possible. Therefore, functions of the components in the electrical equipment section 92 and the fluid supply section 88 are maintained suitably, and the components are operated reliably.

Further, in the module section 90 having high temperature, for example, considerably thick heat insulating material 68 may be provided around the fuel cell module 12 and the combustor 14 to suppress the heat influence to the outside.

Further, in the casing 26, the fluid supply section 88, the module section 90, and the electrical equipment section 92 are arranged in the direction indicated by the arrow B. In the structure, the casing 26 is elongated in the lateral direction indicated by the arrow B, and shortened in the depth direction indicated by the arrow C. The casing 26 can be placed along the wall 102 suitably and efficiently.

Further, since the fluid supply section 88, the module section 90, and the electrical equipment section 92 are arranged in the lateral direction, components in the casing 26 can be accessed from the front side for maintenance purpose. Accordingly, the maintenance can be carried out easily.

In particular, on the front side of the casing 26, the door 104a for the fluid supply section 88, the door 104b for the module section 90, and the door 104c for the electrical equipment section 92 are provided. Therefore, by opening and closing the doors 104a, 104b, 104c as necessary, maintenance operation can be performed easily and reliably for each of the fluid supply section 88, the module section 90, and the electrical equipment section 92.

Figure 6:
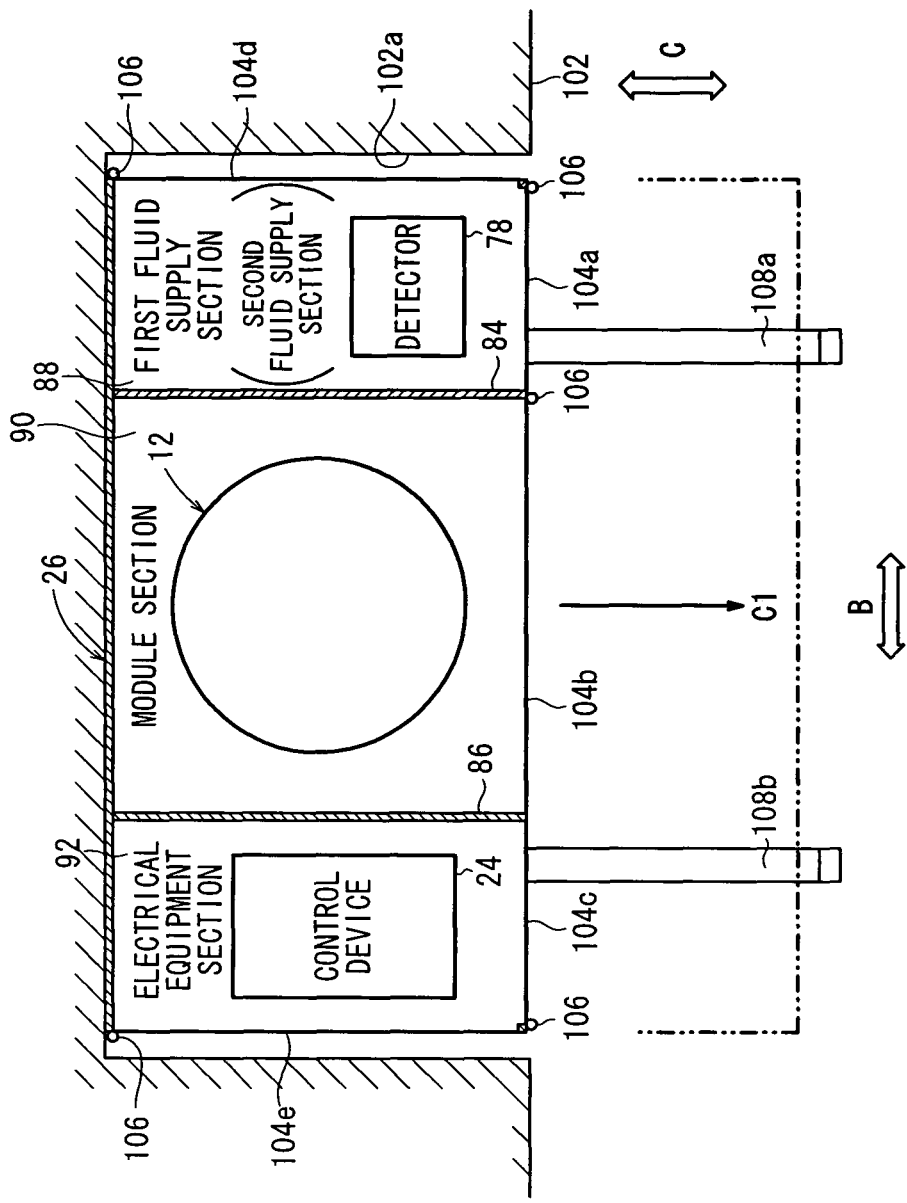
FIG. 6 is a plan view showing a state where the fuel cell system is provided in a recess of a wall.

Further, the casing 26 has one pair of slide rails 108a, 108b for allowing the casing 26 to move back and forth in the direction indicated by the arrow C. Thus, as shown in FIG. 6, when the casing 26 is placed in the recess 102a of the wall, simply by drawing the casing 26 in the direction indicated by the arrow C1 through the slide rails 108a, 108b, it becomes possible to open and close the doors 104d, 104e provided on both side surfaces of the casing 26. Therefore, the maintenance operation for the fluid supply section 88 and the electrical equipment section 92 can be carried out easily, and the casing 26 can be placed along the wall suitably.

Further, in the first embodiment, the water supply apparatus 20 is provided at the bottom of the fluid supply section 88. Therefore, for example, even if water leakage occurs in the water supply apparatus 20, the fuel gas supply apparatus 16 and the oxygen-containing gas supply apparatus 18 do not get wet.

Further, the detector 78 is provided at the top of the fluid supply section 88. In the structure, even if leakage of the fuel gas from the fuel gas supply apparatus 16 occurs, it is possible to swiftly and reliably detect the gas leakage by the detector 78.

Further, in the fluid supply section 88, the fuel gas supply apparatus 16 is disposed above the oxygen-containing gas supply apparatus 18. The oxygen-containing gas supply apparatus 18 has the air pump, and the fuel gas supply apparatus 16 has the fuel gas pump. In particular, in the fuel cell system 10 having a large A/F ratio, the air pump has a large volume and a large weight in comparison with the fuel gas pump.

Therefore, by disposing the oxygen-containing gas supply apparatus 18 below the fuel gas supply apparatus 16, these components can be placed stably. Further, even if leakage of the fuel gas from the fuel gas supply apparatus 16 occurs, the fuel gas is prevented from being inhaled into the oxygen-containing gas supply apparatus 18.

The fluid supply section 88 is divided into the first supply section 96 and the second supply section 98 by the lateral partition plate 94. The detector 78 and the fuel gas supply apparatus 16 are provided in the first supply section 96, and the oxygen-containing gas supply apparatus 18 and the water supply apparatus 20 are provided in the second supply section 98. In the structure, in particular, even if leakage of the fuel gas from the fuel gas supply apparatus 16 occurs, the fuel gas is reliably prevented from being inhaled into the oxygen-containing gas supply apparatus 18.

Further, the fuel cell module 12 is particularly advantageous when it is a solid oxide fuel cell (SOFC) module used for a high temperature fuel cell system. However, instead of the solid oxide fuel cell module, the present invention is also suitably applicable to the other types of high temperature fuel cell modules and medium temperature fuel cell modules. For example, molten-carbonate fuel cells (MCFC), phosphoric acid fuel cells (PAFC), hydrogen membrane fuel cells (HMFC), and the like can be adopted suitably.

Further, in the first embodiment, the heat exchanger 36, the evaporator 38, and the reformer 40 are disposed above the fuel cell stack 34, and the combustor 14 is disposed below the fuel cell stack 34. In the structure, the heat from the combustor 14 tends to be concentrated in the fuel cell stack 34, and the time for raising the temperature of the fuel cell stack 34 is shortened advantageously. Accordingly, improvement in the performance in starting operation of the fuel cell stack 34 is achieved.

In the first embodiment, the three doors 104a to 104c are provided on the front surface of the casing 26, corresponding to the fluid supply section 88, the module section 90, and the electrical equipment section 92. However, the present invention is not limited in this respect. For example, two doors or one door may be adopted.

Further, although the pair of slide rails 108a, 108b are used as guide members, the present invention is not limited in this respect. For example, various members such as movable plates may be adopted.

Figure 7:
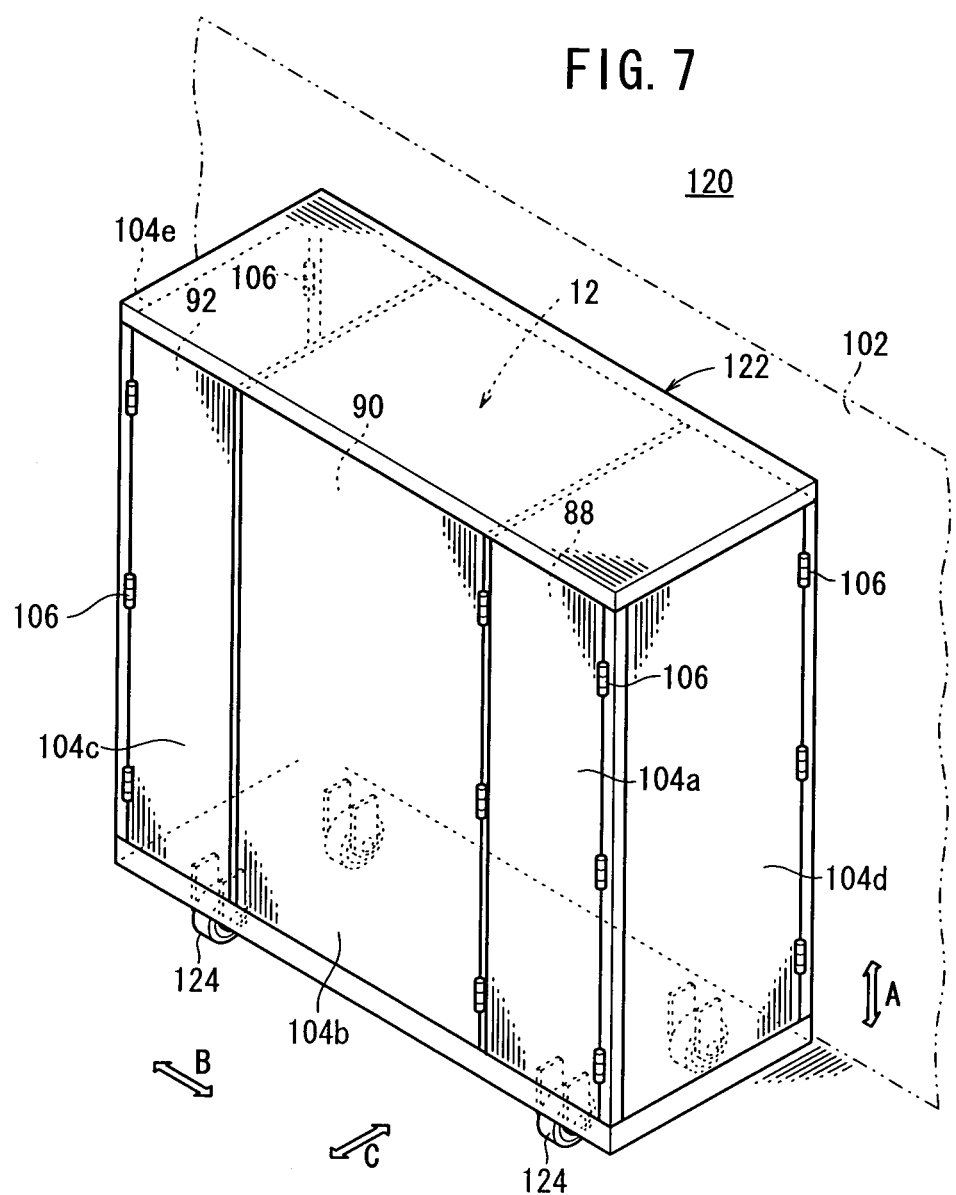
FIG. 7 is a perspective view schematically showing a fuel cell system according to a second embodiment of the present invention.

FIG. 7 is a perspective view schematically showing a fuel cell system 120 according to a second embodiment of the present invention. The constituent elements that are identical to those of the fuel cell system 10 according to the first embodiment are labeled with the same reference numeral, and description thereof will be omitted. Further, also in a third embodiment as described later, the constituent elements that are identical to those of the fuel cell system 10 according to the first embodiment are labeled with the same reference numeral, and description thereof will be omitted.

The fuel cell system 120 includes a casing 122 having a plurality of wheels 124 at the bottom of the casing 122. Therefore, in the second embodiment, the casing 122 is movable in various directions arbitrarily and easily by the wheels 124. Thus, the fluid supply section 88, the module section 90, and the electrical equipment section 92 can be positioned easily at a position where operation by the operator can be performed smoothly, so that the operator can perform various operations easily.

In the second embodiment, although only the wheels 124 are provided, both of the wheels 124 and the slide rails 108a, 108b may be used in combination.

Figure 8:
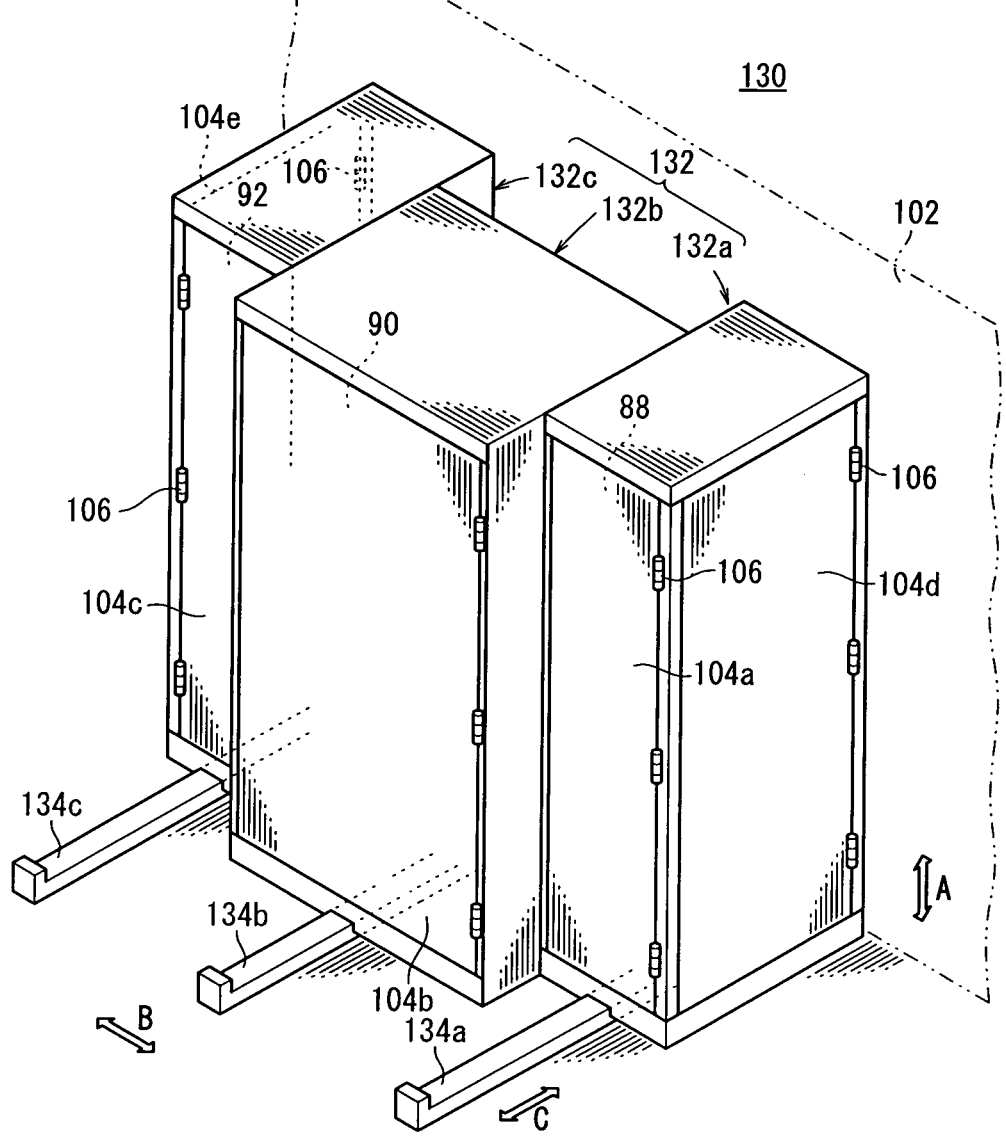
FIG. 8 is a perspective view schematically showing a fuel cell system according to a third embodiment of the present invention.
Figure 9:
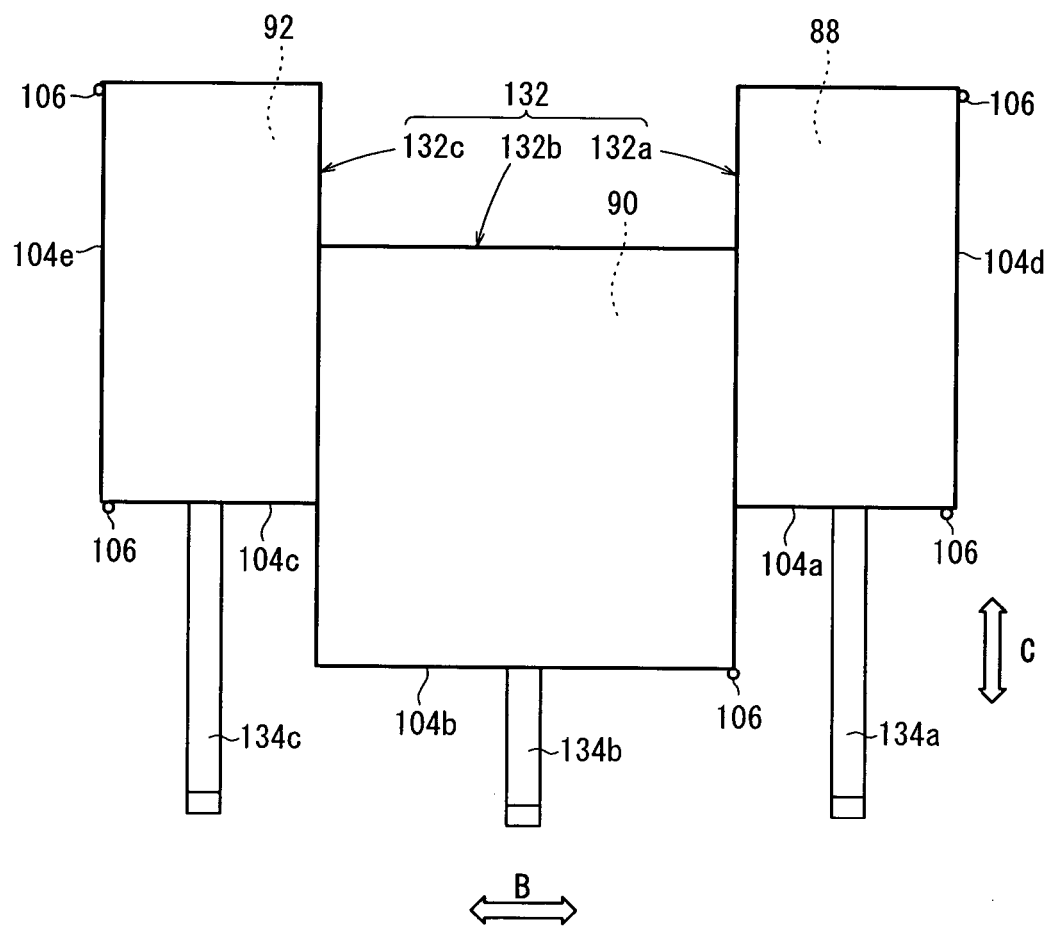
FIG. 9 is a plan view showing an operating state of the fuel cell system.

FIG. 8 is a perspective view schematically showing a fuel cell system 130 according to a third embodiment. FIG. 9 is a plan view showing an operating state of the fuel cell system 130.

The fuel cell system 130 includes a casing 132 having a first case unit 132a, a second case unit 132b, and a third case unit 132c separately. The fluid supply section 88 is formed in the first case unit 132a, the module section 90 is formed in the second case unit 132b, and the electrical equipment section 92 is formed in the third case unit 132c.

The first case unit 132a is movable back and forth in the direction indicated by the arrow C along a slide rail 134a. The second case unit 132b is movable back and forth in the direction indicated by the arrow C along a slide rail 134b. The third case unit 132c is movable back and forth in the direction indicated by the arrow C along a slide rail 134c. The first case unit 132a, the second case unit 132b, and the third case unit 132c can be fixed together by a stopper mechanism (not shown).

In the third embodiment, for example, when maintenance operation of the module section 90 is performed, as shown in FIGS. 8 and 9, only the second case unit 132b is moved in the direction indicated by the arrow C. In the structure, maintenance operation of the module section 90 is carried out further easily and reliably.

Figure 10:
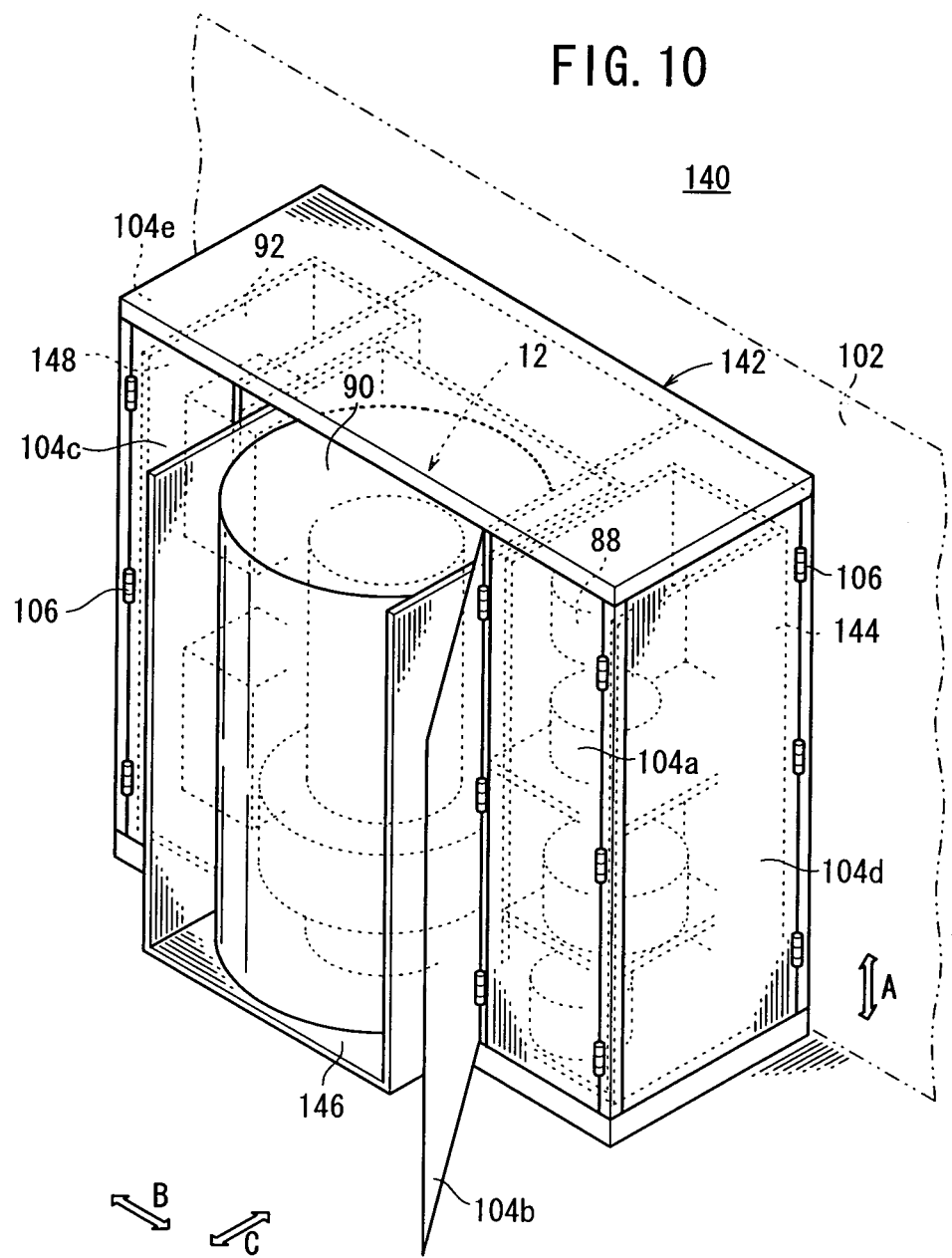
FIG. 10 is a perspective view schematically showing a fuel cell system according to a fourth embodiment of the present invention.
Figure 11:
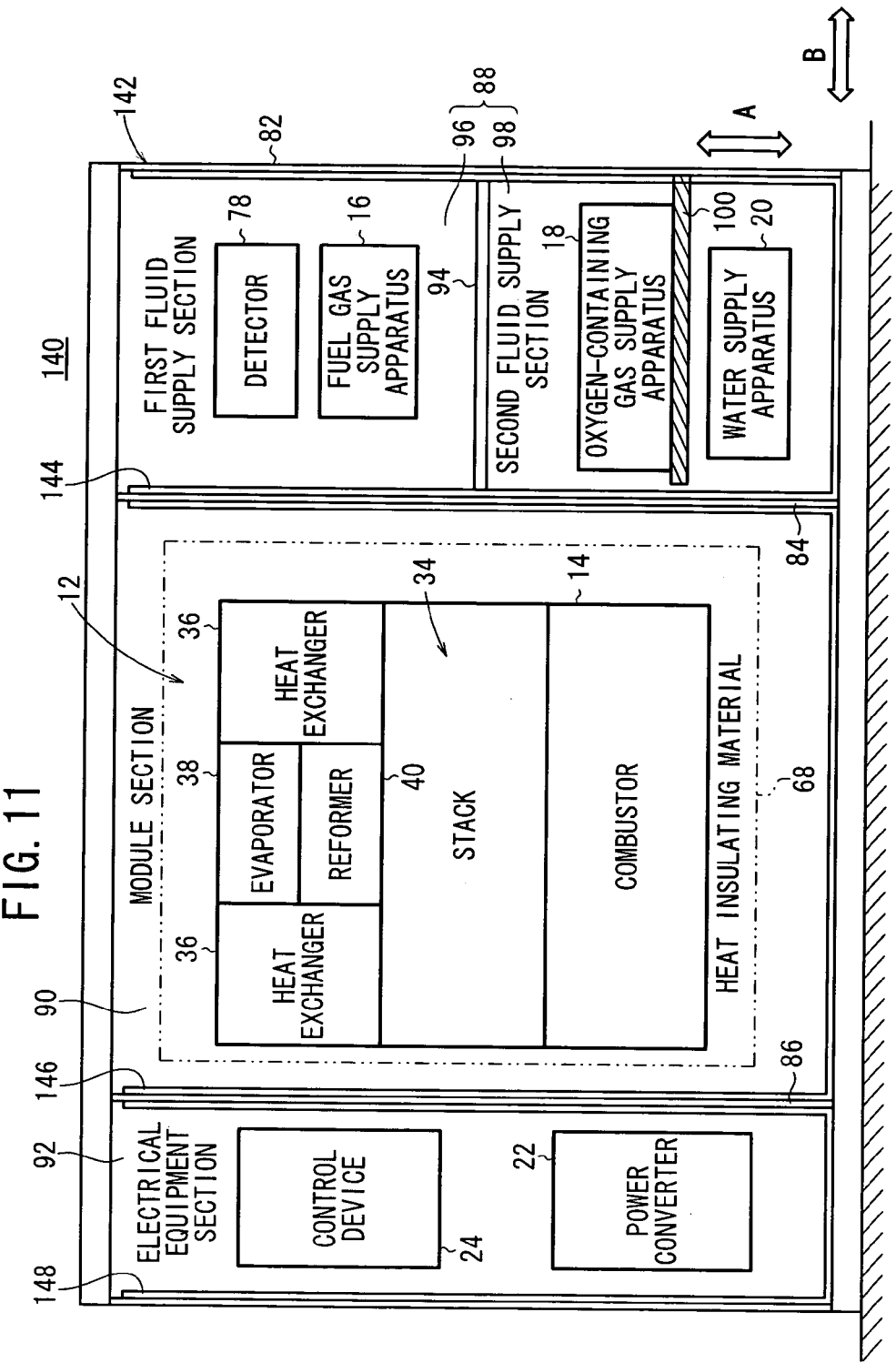
FIG. 11 is a front view showing the fuel cell system.

FIG. 10 is a perspective view schematically showing a fuel cell system 140 according to a fourth embodiment of the present invention. FIG. 11 is a front view showing the fuel cell system 140.

The fuel cell system 140 includes a casing 142 having guide members such as rack members 144, 146, and 148 for allowing the fluid supply section 88, the module section 90, and the electrical equipment section 92 to move back and forth, relative to an outer frame 82 in the direction indicated by the arrow C. The fluid supply section 88 is fixed to the rack member 144, the module section 90 is fixed to the rack member 146, and the electrical equipment section 92 is fixed to the rack member 148.

In the fourth embodiment, for example, when maintenance operation of the module section 90 is performed, as shown in FIG. 10, the rack member 146 is moved from the outer frame 82 in the direction indicated by the arrow C. In the structure, maintenance operation of the module section 90 is carried out further easily and reliably.

Figure 12:
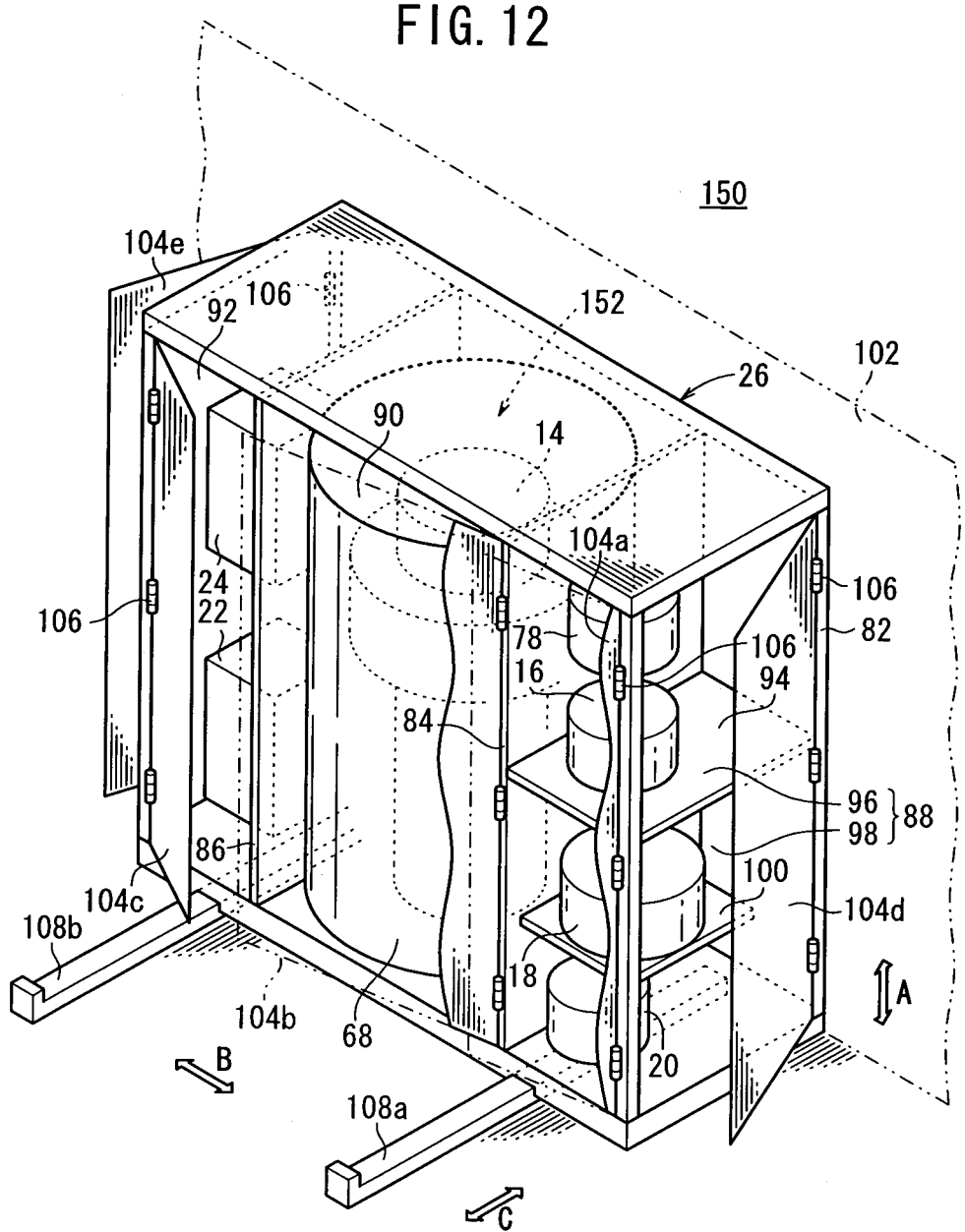
FIG. 12 is a perspective view schematically showing a fuel cell system according to a fifth embodiment of the present invention.
Figure 13:
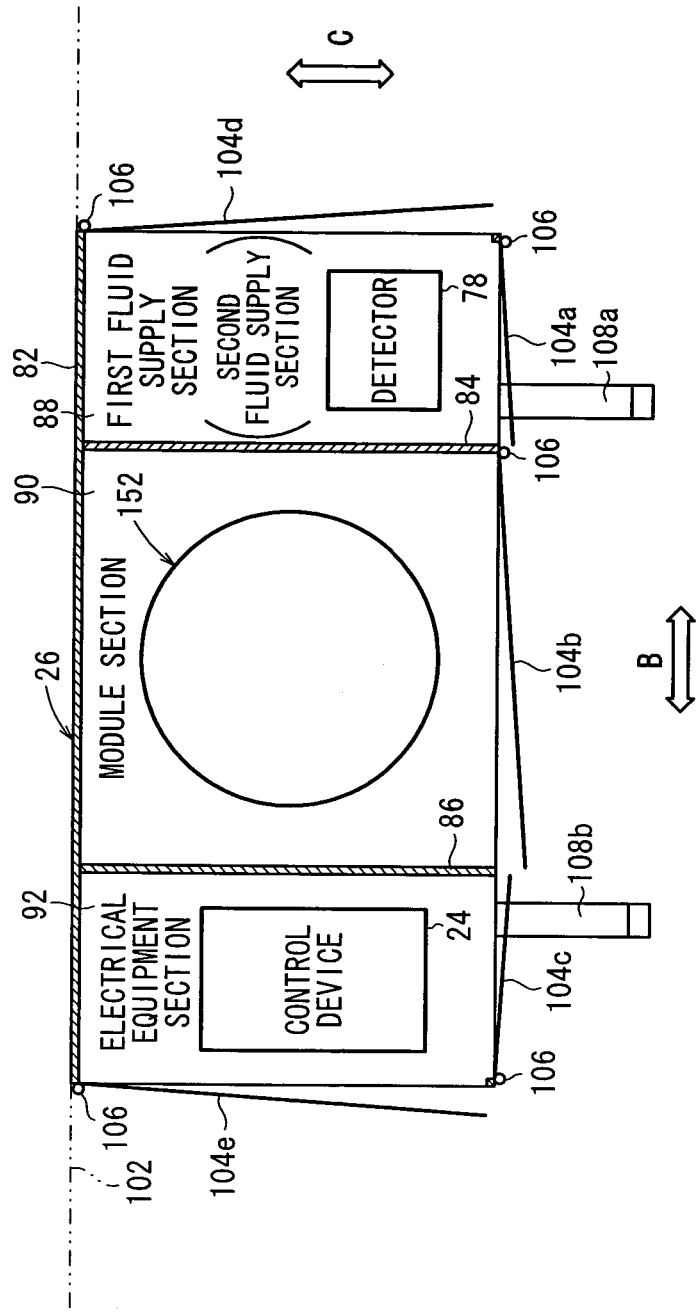
FIG. 13 is a plan view showing the fuel cell system.
Figure 14:
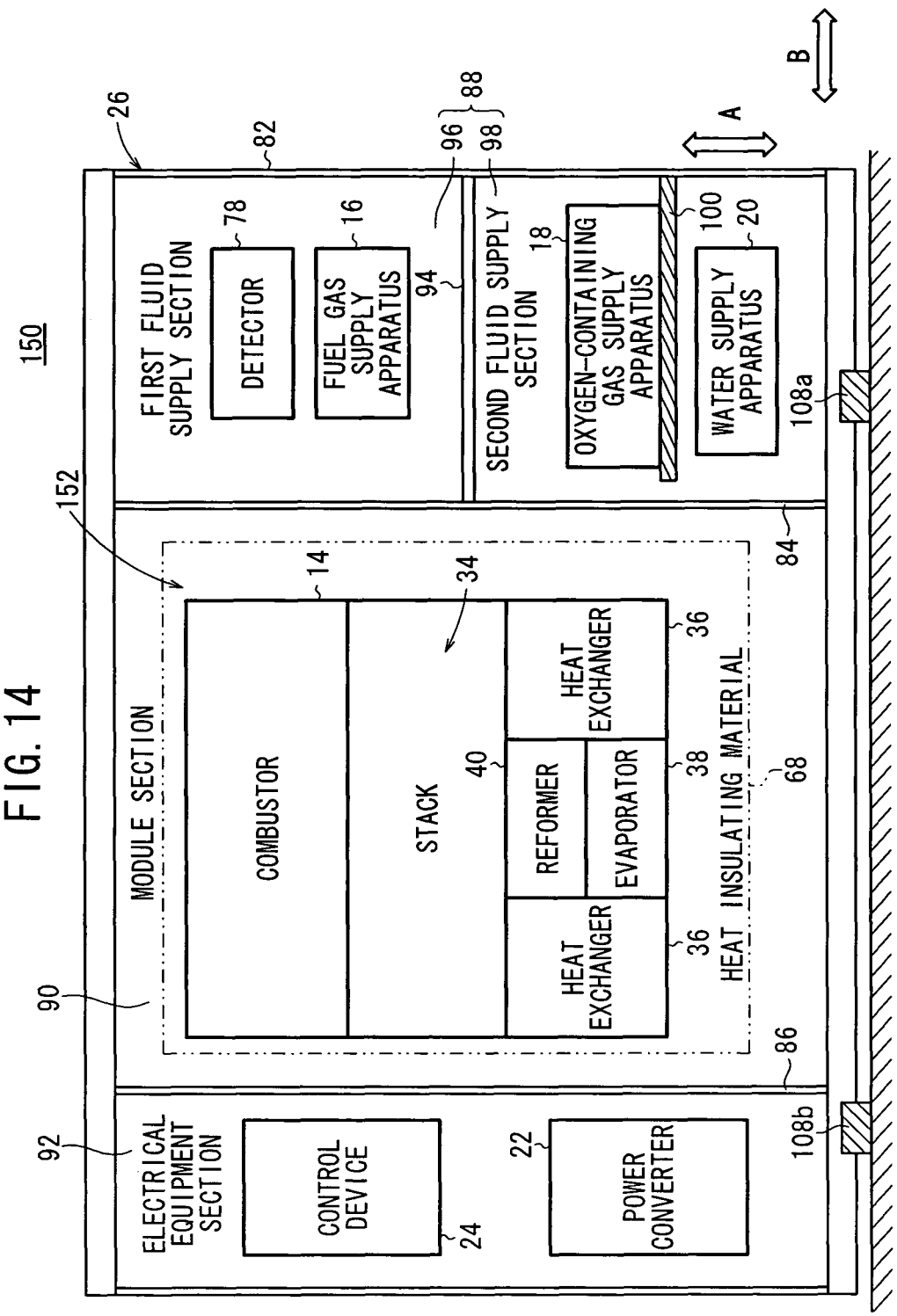
FIG. 14 is a front view showing the fuel cell system.

FIG. 12 is a perspective view schematically showing a fuel cell system 150 according to a fifth embodiment of the present invention. FIG. 13 is a plan view showing the fuel cell system 150. FIG. 14 is a front view showing the fuel cell system 150.

Figure 15:
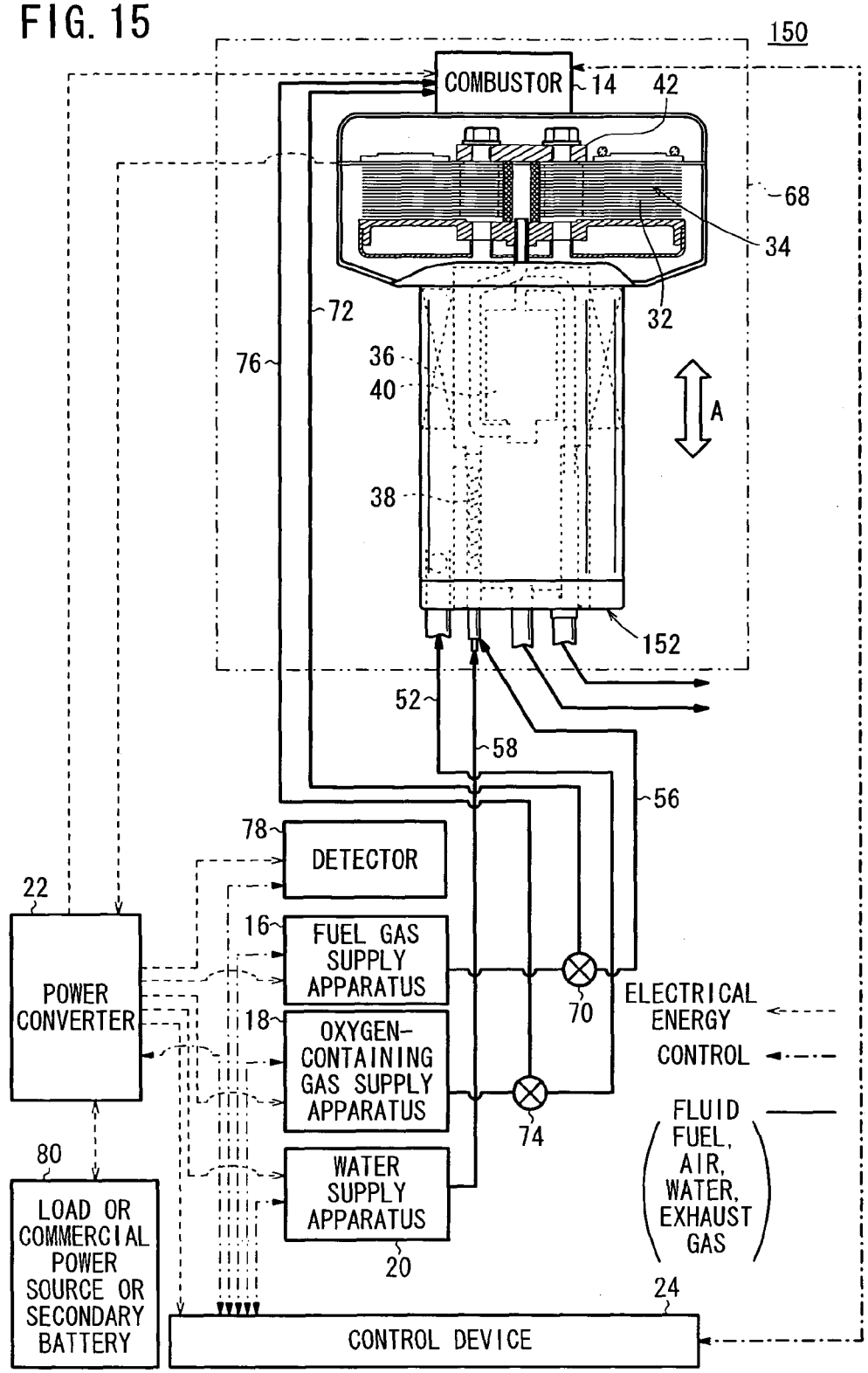
FIG. 15 is a circuit diagram showing the fuel cell system.
Figure 16:
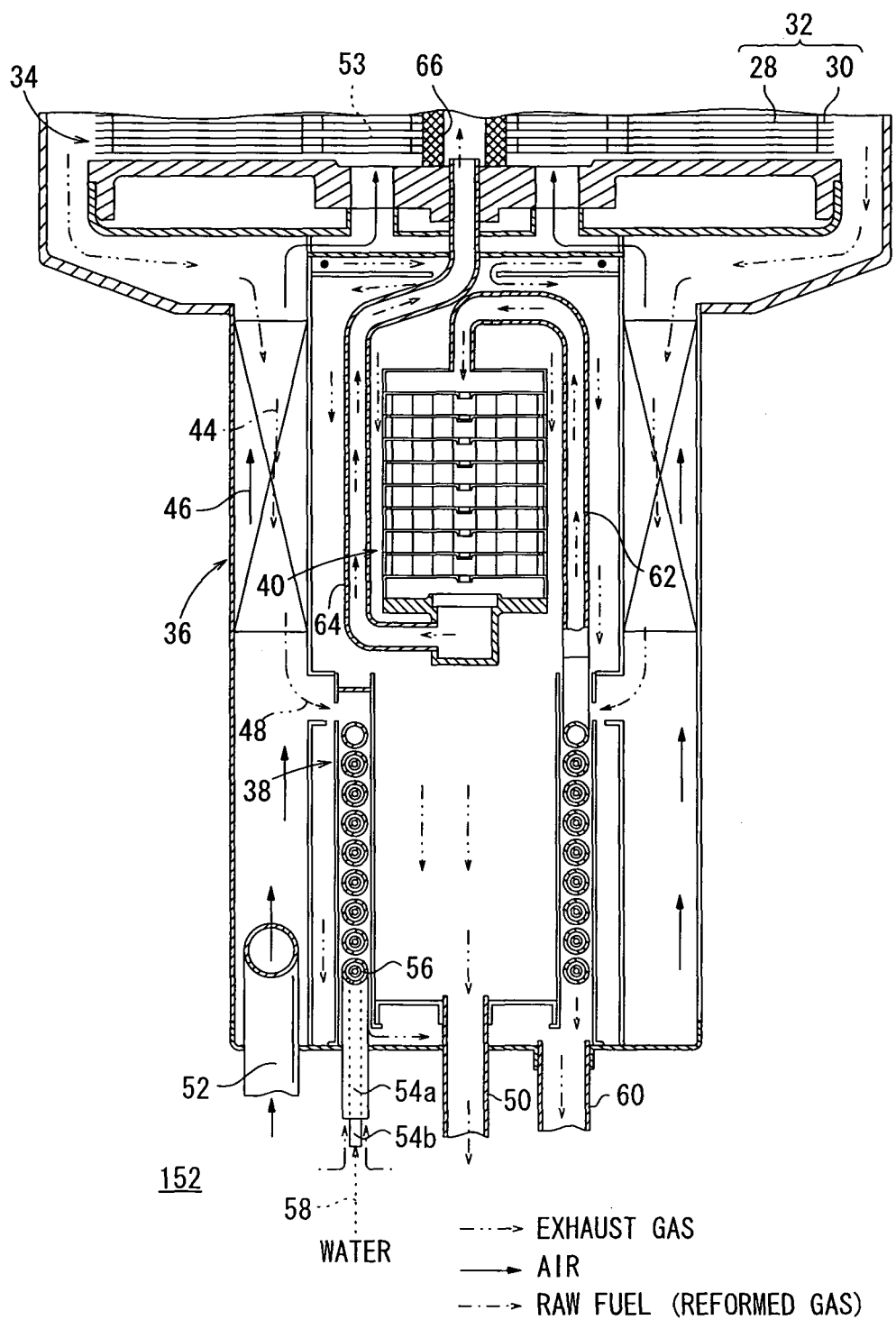
FIG. 16 is a cross sectional view showing main components of a fuel cell module of the fuel cell system.

The fuel cell system 150 has a fuel cell module 152. In the fuel cell module 152, the heat exchanger 36, the evaporator 38, and the reformer 40 are provided at the lower end side in the stacking direction of the fuel cell stack 34 (see FIGS. 15 and 16). A load applying mechanism 42 is provided at the upper end side in the stacking direction of the fuel cell stack 34 (see FIG. 15).

In the fifth embodiment, as shown in FIGS. 12 and 14, the space in the casing 26 is divided horizontally to form the module section 90, and the fuel cell module 152 and the combustor 14 are provided in the module section 90. The combustor 14 is disposed above the fuel cell module 152.

In the structure, heat (several hundred ° C.) generated by operation of the combustor 14 is supplied to the desired position of the fuel cell module 152, i.e., the fuel cell stack 34. Thus, the temperature of the fuel cell stack 34 is raised.

Further, the other portions of the fuel cell module 152 functioning at relatively low temperature, i.e., the heat exchanger 36, the evaporator 38, and the reformer 40 are not exposed to the heat from the combustor 14 more than necessary. It is because the heat exchanger 36, the evaporator 38, and the reformer 40 are disposed below the fuel cell stack 34. Accordingly, improvement in the product life and durability of the heat exchanger 36, the evaporator 38, the reformer 40 and piping is achieved advantageously.

Also, in the fifth embodiment, the heat exchanger 36, the evaporator 38, and the reformer 40 are disposed below the fuel cell stack 34, while the combustor 14 is disposed above the fuel cell stack 34. Thus, heat from the combustor 14 is supplied to the fuel cell stack 34, and the temperature of the fuel cell stack 34 is raised. Additionally, the heat exchanger 36, the evaporator 38, and the reformer 40 are not exposed to the heat from the combustor 14 more than necessary, and thus, improvement in the product life and durability thereof is achieved.

In the fifth embodiment, the same advantages as in the case of the first embodiment are obtained. Specifically, the space in the casing 26 is divided into the fluid supply section 88, the module section 90, and the electrical equipment section 92 by the first vertical partition plate 84 and the second vertical partition plate 86. The detector 78, the fuel gas supply apparatus 16, the oxygen-containing gas supply apparatus 18, and the water supply apparatus 20 are provided in the fluid supply section 88. The fuel cell module 152 and the combustor 14 are disposed in the module section 90. The power converter 22 and the control device 24 are disposed in the electrical equipment section 92.

Thus, the space in the casing 26 is divided into the module section 90, the fluid supply section 88, and the electrical equipment section 92 depending on the operating temperature and the function. In the structure, diffusion of heat and fluid is minimized. In terms of functionality, the module section 90, the fluid supply section 88, and the electrical equipment section 92 are arranged suitably.

Further, since the fluid supply section 88 forms part of the outer wall of the casing 26, cooling of the fluid supply section 88 is facilitated, and the fluid supply section 88 does not become hot easily. Likewise, since the electrical equipment section 92 forms part of the outer wall of the casing 26, cooling of the electrical equipment section 92 is facilitated, and the electrical equipment section 92 does not become hot easily.

The temperatures of the electrical equipment section 92 containing the control device 24 and the fluid supply section 88 containing the pumps need to be maintained at low temperature (around 40° C.). Thermal influence on the electrical equipment section 92 and the fluid supply section 88 is prevented as much as possible. Therefore, functions of the components in the electrical equipment section 92 and the fluid supply section 88 are maintained, and the components are operated reliably.

Further, in the module section 90 having high temperature, for example, considerably thick heat insulating material 68 may be provided around the fuel cell module 152 and the combustor 14 to suppress the heat influence to the outside.

Further, in the casing 26, the fluid supply section 88, the module section 90, and the electrical equipment section 92 are arranged in the direction indicated by the arrow B. In the structure, the casing 26 is elongated in the lateral direction indicated by the arrow B, and shortened in the depth direction indicated by the arrow C. The casing 26 can be placed along the wall 102 suitably.

Further, since the fluid supply section 88, the module section 90, and the electrical equipment section 92 are arranged in the lateral direction, components in the casing 26 can be accessed from the front side for maintenance operation. Accordingly, the maintenance operation can be carried out easily.

In particular, on the front side of the casing 26, the door 104a for the fluid supply section 88, the door 104b for the module section 90, and the door 104c for the electrical equipment section 92 are provided. Therefore, by opening and closing the doors 104a, 104b, 104c as necessary, maintenance operation can be performed easily and reliably for each of the fluid supply section 88, the module section 90, and the electrical equipment section 92.

Figure 17:
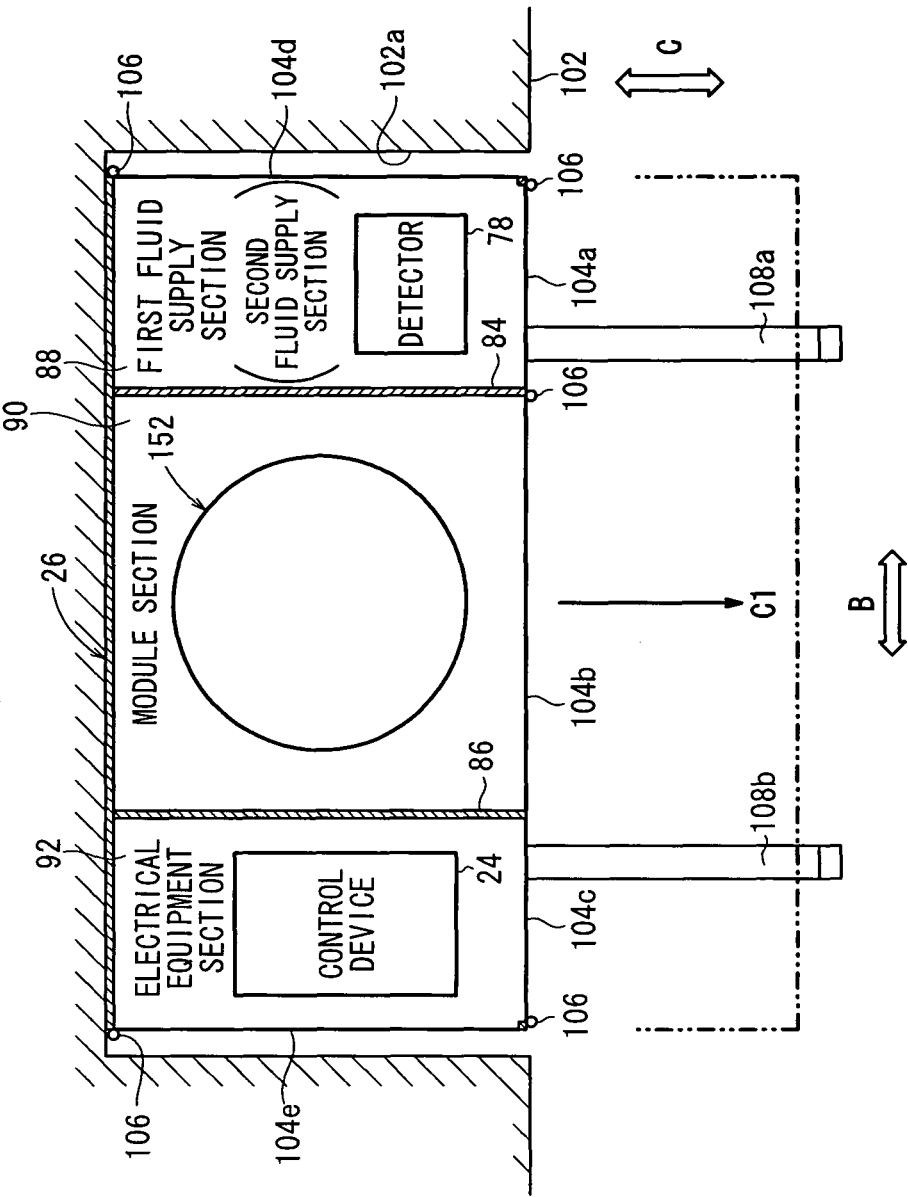
FIG. 17 is a plan view showing a state where the fuel cell system is provided in a recess of a wall.

Further, the casing 26 has the pair of slide rails 108a, 108b for allowing the casing 26 to move back and forth in the direction indicated by the arrow C. Thus, as shown in FIG. 17, when the casing 26 is placed in the recess 102a of the wall 102, simply by drawing the casing 26 in the direction indicated by the arrow C1 through the slide rails 108a, 108b, it becomes possible to open and close the doors 104d, 104e provided on both side surfaces of the casing 26. Therefore, the maintenance operation for the fluid supply section 88 and the electrical equipment section 92 can be carried out easily, and the casing 26 can be placed along the wall suitably.

Further, in the fifth embodiment, the water supply apparatus 20 is provided at the bottom of the fluid supply section 88. Therefore, for example, even if water leakage occurs in the water supply apparatus 20, the fuel gas supply apparatus 16 and the oxygen-containing gas supply apparatus 18 do not get wet.

Further, the detector 78 is provided at the top of the fluid supply section 88. In the structure, even if leakage of the fuel gas from the fuel gas supply apparatus 16 occurs, it is possible to swiftly and reliably detect the gas leakage by the detector 78.

Further, in the fluid supply section 88, the fuel gas supply apparatus 16 is disposed above the oxygen-containing gas supply apparatus 18. The oxygen-containing gas supply apparatus 18 has the air pump, and the fuel gas supply apparatus 16 has the fuel gas pump. In particular, in the fuel cell system having a large A/F ratio, the air pump has a large volume and a large weight in comparison with the fuel gas pump.

Therefore, by disposing the oxygen-containing gas supply apparatus 18 below the fuel gas supply apparatus 16, these components can be placed stably. Further, even if leakage of the fuel gas from the fuel gas supply apparatus 16 occurs, the fuel gas is prevented from being inhaled into the oxygen-containing gas supply apparatus 18.

The fluid supply section 88 is divided into the first supply section 96 and the second supply section 98 by the lateral partition plate 94. The detector 78 and the fuel gas supply apparatus 16 are disposed in the first supply section 96, and the oxygen-containing gas supply apparatus 18 and the water supply apparatus 20 are disposed in the second supply section 98. In the structure, in particular, even if leakage of the fuel gas from the fuel gas supply apparatus 16 occurs, the fuel gas is reliably prevented from being inhaled into the oxygen-containing gas supply apparatus 18.

Further, the fuel cell module 152 is particularly advantageous when it is a solid oxide fuel cell (SOFC) module used for a high temperature fuel cell system. However, instead of the solid oxide fuel cell module, the present invention is also suitably applicable to the other types of high temperature fuel cell modules and medium temperature fuel cell modules. For example, molten-carbonate fuel cells (MCFC), phosphoric acid fuel cells (PAFC), hydrogen membrane fuel cells (HMFC) and the like can be adopted suitably.

In effect, the fifth embodiment can be adopted instead of the first embodiment. However, the present invention is not limited in this respect. The fifth embodiment may be applicable to the second to fourth embodiments. Sixth and seventh embodiments (to be described later) may be applicable to the second to fourth embodiments as well.

Figure 18:
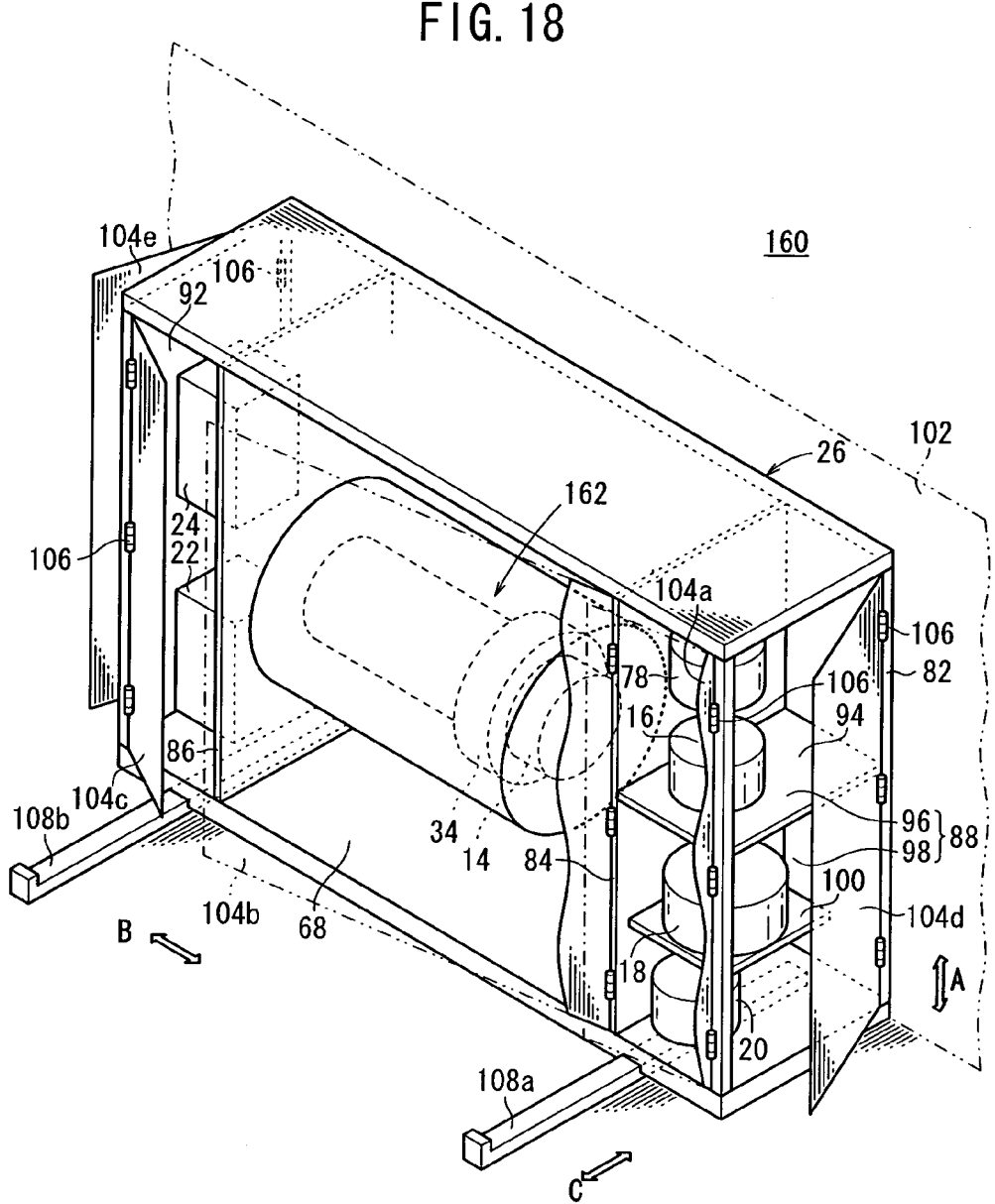
FIG. 18 is a perspective view schematically showing a fuel cell system according to a sixth embodiment of the present invention.
Figure 19:
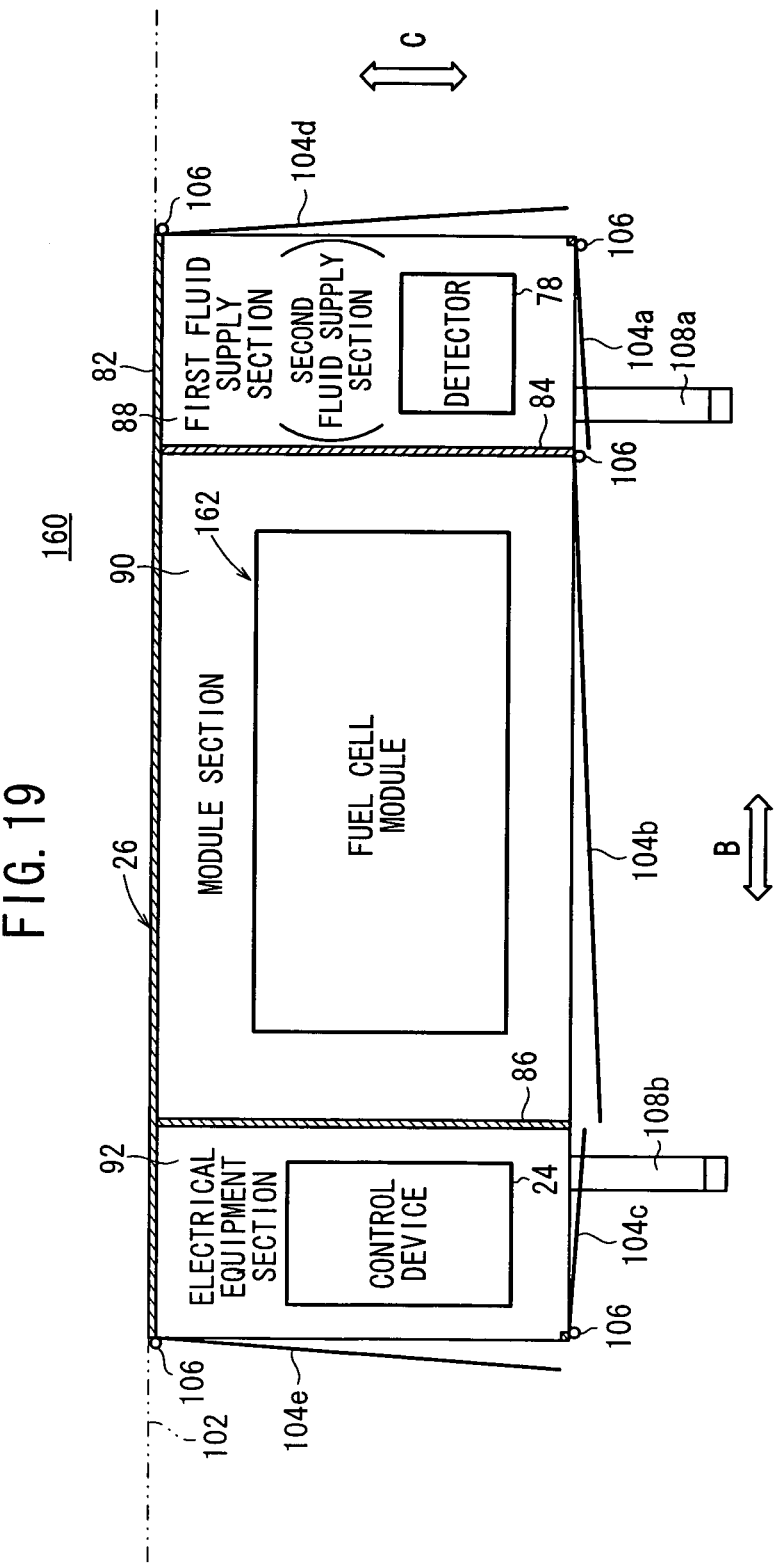
FIG. 19 is a plan view showing the fuel cell system.
Figure 20:
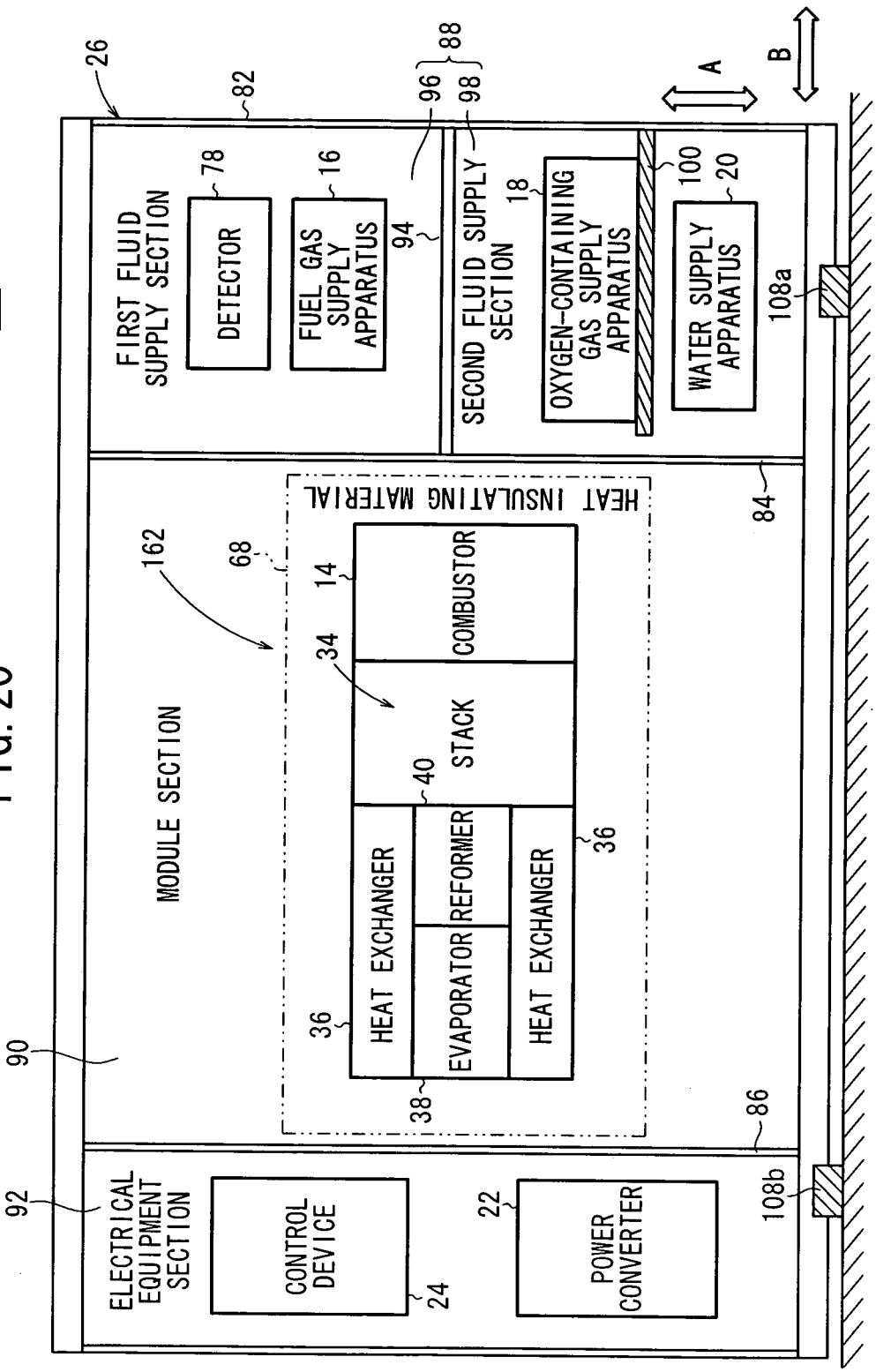
FIG. 20 is a front view showing the fuel cell system.

FIG. 18 is a perspective view schematically showing a fuel cell system 160 according to a sixth embodiment of the present invention. FIG. 19 is a plan view showing the fuel cell system 160. FIG. 20 is a front view showing the fuel cell system 160.

The fuel cell system 160 includes a fuel cell module 162. In the fuel cell module 162, the stacking direction of the fuel cell stack 34 is a horizontal direction indicated by an arrow B. As shown in FIG. 20, the heat exchanger 36, the evaporator 38, and the reformer 40 are provided at one end of the fuel cell stack 34 in the stacking direction (electrical equipment section 92 side), and the combustor 14 is provided at the other end in the stacking direction (fluid supply section 88 side).

In the sixth embodiment, the same advantages as in the cases of the first to fifth embodiments are obtained. Further, in particular, since the fuel cell module 162 is elongated in the horizontal direction, the distance between the electrical equipment section 92 and the combustor 14 becomes large. The temperature of the control device 24 in the electrical equipment section 92 needs to be maintained at low temperature (around 40° C.). Thermal influence of the combustor 14 on the electrical equipment section 92 including the control device 24 is prevented as much as possible. The temperature of the electrical equipment section 92 is reliably prevented from becoming high.

Figure 21:
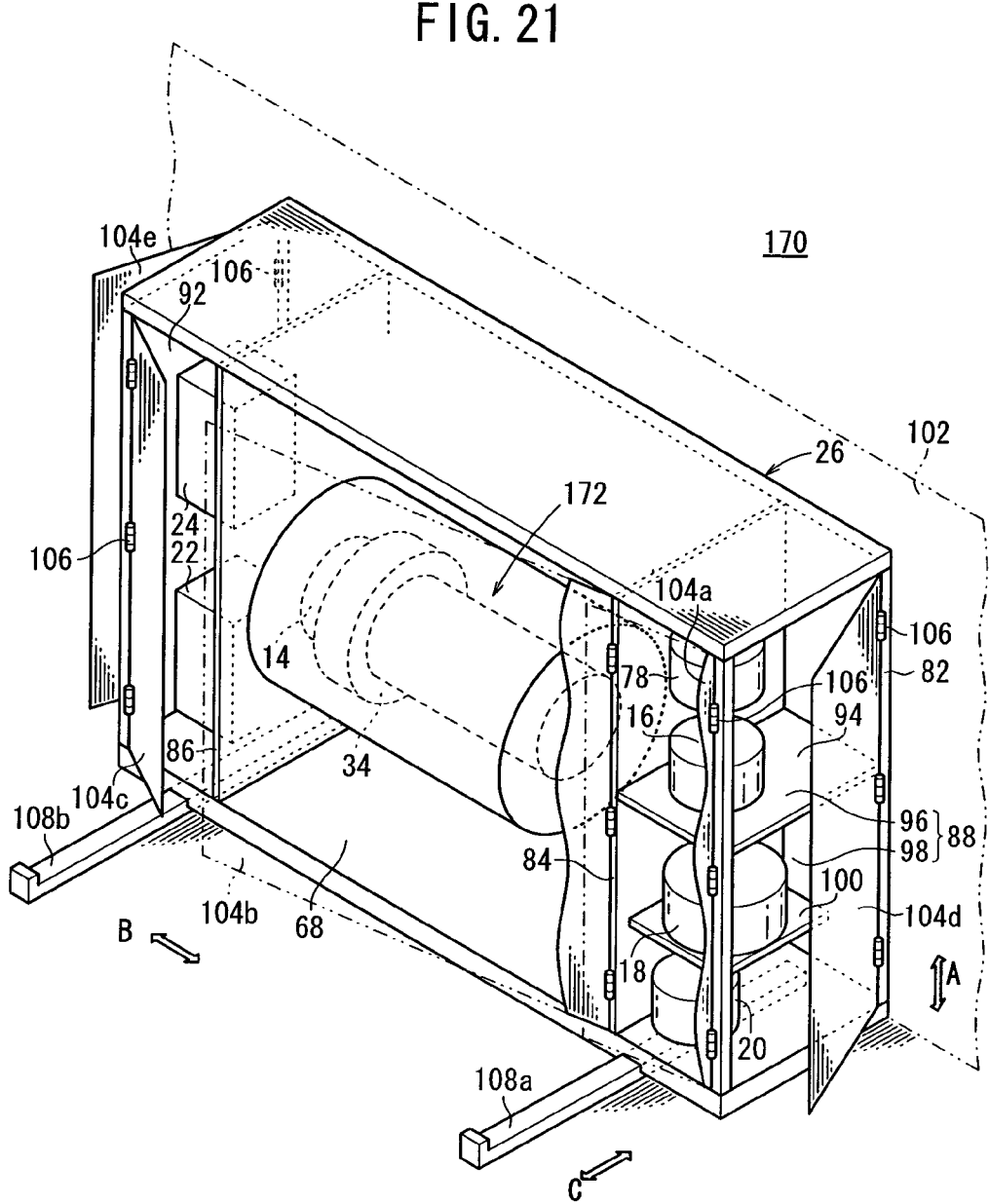
FIG. 21 is a perspective view showing a fuel cell system according to a seventh embodiment of the present invention.
Figure 22:
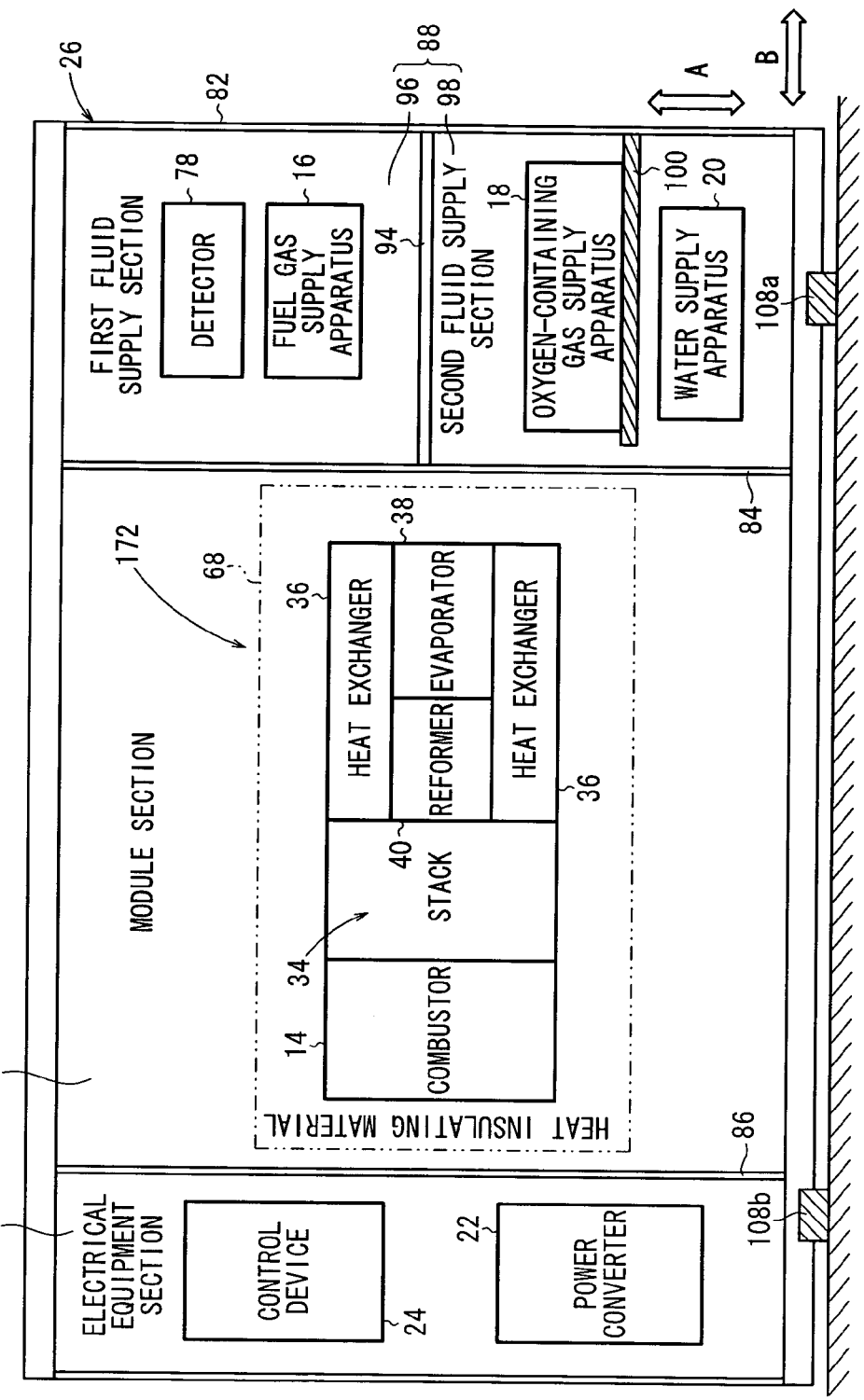
FIG. 22 is a front view showing the fuel cell system.
Figure 23:
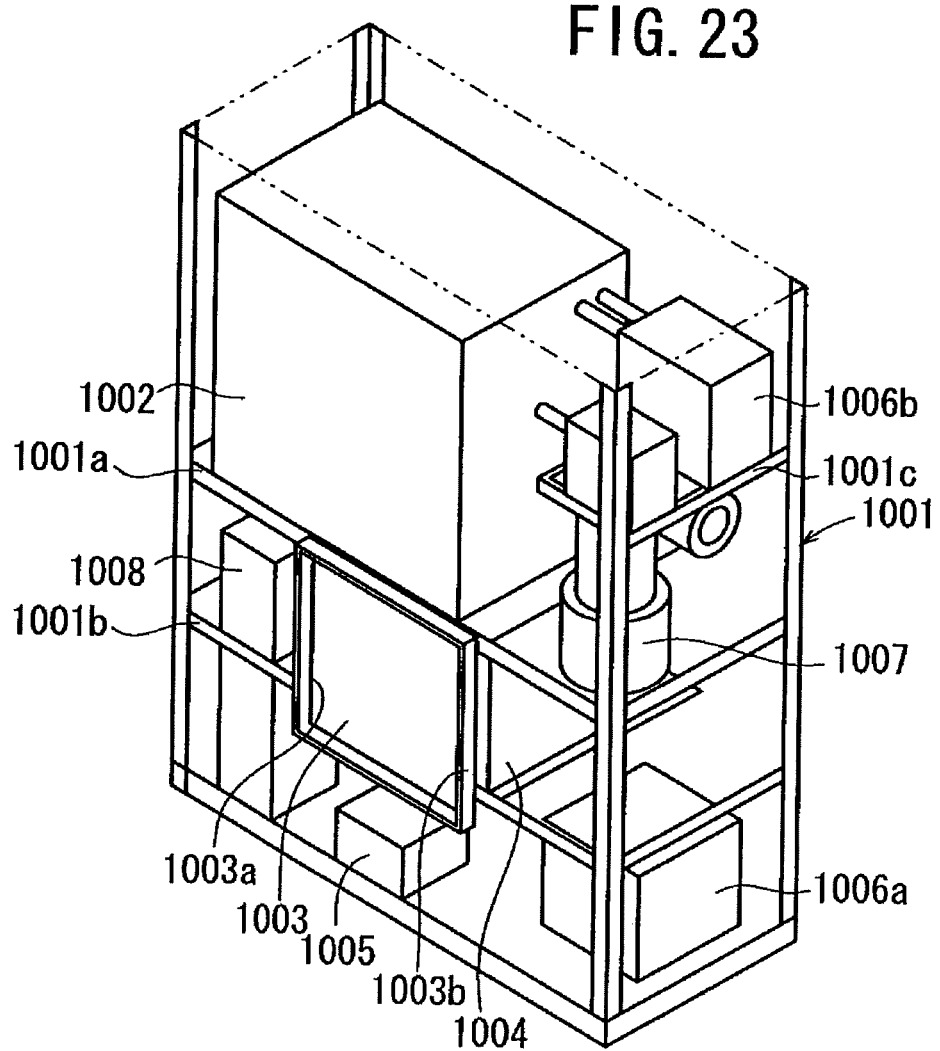
FIG. 23 is a perspective view schematically showing a fuel cell power supply apparatus disclosed in Japanese Laid-Open Patent Publication No. 2003-297409.
Figure 24:
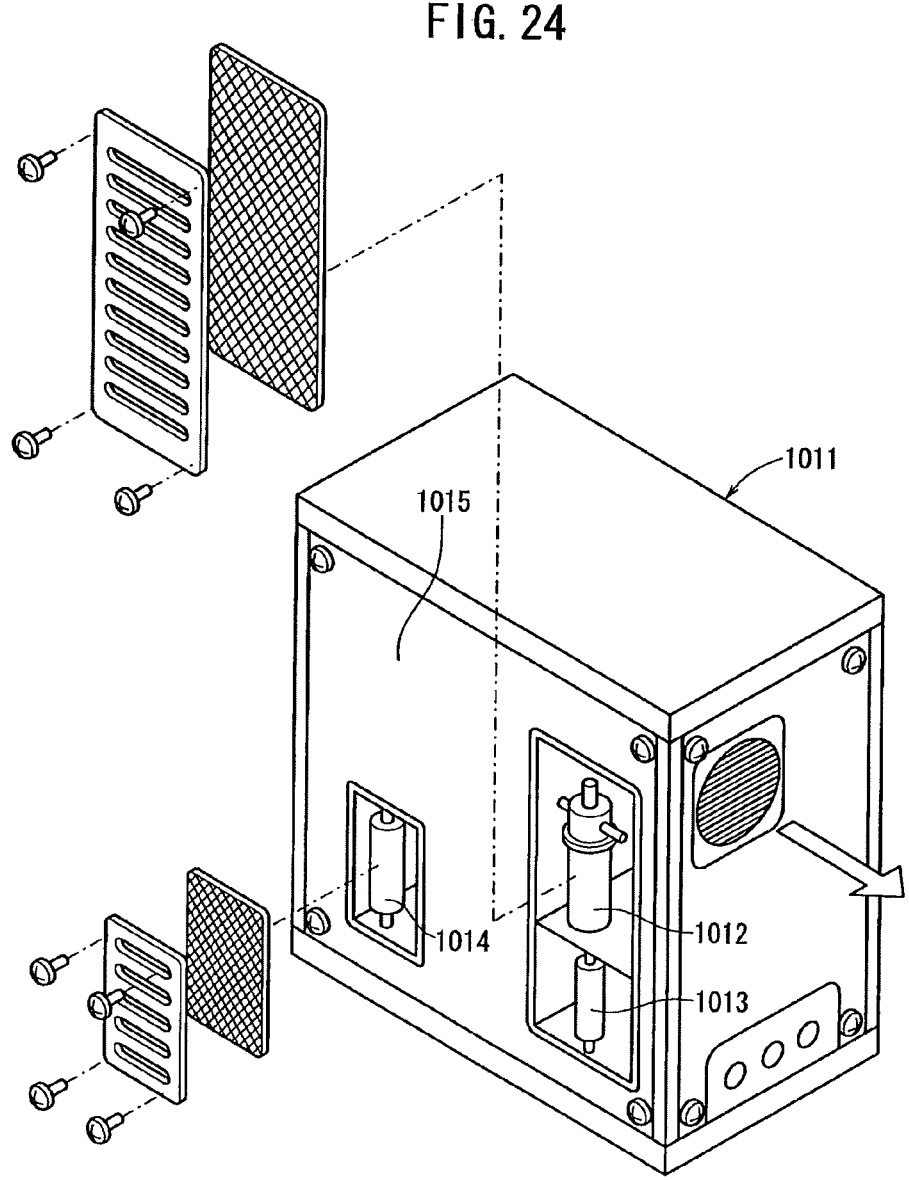
FIG. 24 is a perspective view schematically showing a fuel cell apparatus disclosed in Japanese Laid-Open Patent Publication No. 2006-140164.

FIG. 21 is a perspective view schematically showing a fuel cell system 170 according to a seventh embodiment of the present invention. FIG. 22 is a front view showing the fuel cell system 170.

The fuel cell system 170 includes a fuel cell module 172. In the fuel cell module 172, the stacking direction of the fuel cell stack 34 is a horizontal direction indicated by an arrow B. The combustor 14 is provided at one end of the fuel cell stack 34 in the stacking direction (electrical equipment section 92 side), and the heat exchanger 36, the evaporator 38, and the reformer 40 are provided at the other end in the stacking direction (fluid supply section 88 side).

In the seventh embodiment, since the fuel cell module 172 is elongated in the horizontal direction, the distance between the fluid supply section 88 and the combustor 14 becomes large. The fluid supply section 88 contains the pumps which need to be maintained at low temperature. Thermal influence on the fluid supply section 88 from the combustor 14 is prevented as much as possible. The temperature of the fluid supply section 88 is reliably prevented from becoming high. Further, the distance between the fluid supply section 88 and the fuel cell module 172 becomes small. Thus, the pressure losses in the fluids (fuel gas, oxygen-containing gas, water) supplied to the fuel cell module 172 is suppressed.

While the invention has been particularly shown and described with reference to preferred embodiments, it will be understood that variations and modifications can be effected thereto by those skilled in the art without departing from the scope of the invention as defined by the appended claims.

The invention claimed is:

1. A fuel cell system comprising:
    a fuel cell module for generating electrical energy by electrochemical reactions of a fuel gas and an oxygen-containing gas;
    a combustor for raising temperature of the fuel cell module;
    a fuel gas supply apparatus for supplying the fuel gas to the fuel cell module;
    an oxygen-containing gas supply apparatus for supplying the oxygen-containing gas to the fuel cell module;
    a water supply apparatus for supplying water to the fuel cell module;
    a power converter for converting direct current electrical energy generated in the fuel cell module to electrical energy according to requirements specification;
    a control device for controlling the amount of electrical energy generated in the fuel cell module; and
    a casing containing the fuel cell module, the combustor, the fuel gas supply apparatus, the oxygen-containing gas supply apparatus, the water supply apparatus, the power converter, and the control device,
    wherein the casing is formed of a first case unit storing a fluid supply section where the fuel gas supply apparatus, the oxygen-containing gas supply apparatus, and the water supply apparatus are disposed, a second case unit storing a module section where the fuel cell module and the combustor are disposed, and a third case unit storing an electrical equipment section where the power converter and the control device are disposed;
    the second case unit is interposed between the first case unit and the third case unit;
    the first case unit, the second case unit and the third case unit are independently movable relative to each other; and
    the module section, the fluid supply section and the electrical equipment section are independently movable relative to each other.

2. A fuel cell system according to claim 1, wherein, in the module section, the fuel cell module is disposed above the combustor.

3. A fuel cell system according to claim 1, wherein, in the module section, the combustor is disposed above the fuel cell module.

4. A fuel cell system according to claim 1, wherein the casing has doors for opening and closing the module section, the fluid supply section, and the electrical equipment section.

5. A fuel cell system according to claim 1, wherein the casing has guide members for allowing the module section, the fluid supply section, and the electrical equipment section to move individually or together.

6. A fuel cell system according to claim 1, wherein the casing has a movable wheel.

7. A fuel cell system according to claim 1, wherein the water supply apparatus is disposed at the bottom of the fluid supply section.

8. A fuel cell system according to claim 1, the fluid supply section has a detector for detecting the fuel gas; and
the detector is disposed at the top of the fluid supply section.

9. A fuel cell system according to claim 1, wherein in the fluid supply section, the fuel gas supply apparatus is disposed above the oxygen-containing gas supply apparatus.

10. A fuel cell system according to claim 8, wherein the fluid supply section is divided into a first supply section where the detector and the fuel gas supply apparatus are disposed, and a second supply section where the oxygen-containing gas supply apparatus and the water supply apparatus are disposed.

11. A fuel cell system according to claim 1, wherein the casing is horizontally divided into the module section, the fluid supply section, and the electrical equipment section by vertical partition plates.

12. A fuel cell system according to claim 1, wherein the fuel cell module is a solid oxide fuel cell module.

13. A fuel cell system according to claim 12, wherein the solid oxide fuel cell module comprises:
a solid oxide fuel cell stack formed by stacking a plurality of solid oxide fuel cells each formed by stacking an electrolyte electrode assembly and a separator, the electrolyte electrode assembly at least including an anode, a cathode, and a solid electrolyte interposed between the anode and the cathode;
a heat exchanger for heating the oxygen-containing gas before the oxygen-containing gas is supplied to the solid oxide fuel cell stack;
an evaporator for evaporating water to produce a mixed fuel of the water vapor and a raw fuel chiefly containing hydrocarbon; and
a reformer for reforming the mixed fuel to produce a reformed gas.

14. A fuel cell system according to claim 13, wherein the heat exchanger, the evaporator, and the reformer are disposed above the fuel cell stack.

15. A fuel cell system according to claim 13, wherein the heat exchanger, the evaporator, and the reformer are disposed below the fuel cell stack.

16. A fuel cell system according to claim 8, wherein the fluid supply section is divided into a first supply section where the detector and the fuel gas supply apparatus are disposed, and a second supply section where the oxygen-containing gas supply apparatus and the water supply apparatus are disposed.

* * * * *